United States Patent
Shimokawa et al.

(10) Patent No.: US 11,146,111 B2
(45) Date of Patent: Oct. 12, 2021

(54) POWER RECEIVER, POWER TRANSMISSION SYSTEM, AND POWER RECEIVING METHOD

(71) Applicant: FUJITSU LIMITED, Kawasaki (JP)

(72) Inventors: Satoshi Shimokawa, Kawasaki (JP); Hirotaka Oshima, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/917,970

(22) Filed: Jul. 1, 2020

(65) Prior Publication Data

US 2020/0336013 A1 Oct. 22, 2020

Related U.S. Application Data

(63) Continuation of application No. PCT/JP2018/004672, filed on Feb. 9, 2018.

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC . H02J 50/00; H02J 50/50; H02J 50/12; H04B 5/00
See application file for complete search history.

(56) References Cited

U.S. PATENT DOCUMENTS

| 5,157,277 A * | 10/1992 | Tran | G06F 1/10 327/156 |
|---|---|---|---|
| 2012/0056486 A1 | 3/2012 | Endo et al. | |
| 2016/0064951 A1* | 3/2016 | Yamamoto | H02J 50/20 307/104 |

(Continued)

FOREIGN PATENT DOCUMENTS

| JP | 2012-055157 A | 3/2012 |
|---|---|---|
| JP | 2015-023631 A | 2/2015 |

(Continued)

OTHER PUBLICATIONS

International Search Report and Written Opinion of the International Searching Authority (Form PCT/ISA/210, 220, and 237), mailed in connection with PCT/JP2018/004672 and dated Apr. 10, 2018 (8 pages).

*Primary Examiner* — Adi Amrany
(74) *Attorney, Agent, or Firm* — Fujitsu Patent Center

(57) ABSTRACT

A power receiver includes: a secondary-side resonant coil that includes a resonant coil circuit and receives power from a primary-side resonant coil; a capacitor inserted into the resonant coil circuit; a series circuit including a first switch and a second switch; a first rectifying element having a first rectification direction; a second rectifying element having a second rectification direction; a detection circuit that detects a voltage or a current; a binarization processing circuit that outputs a rectangular wave obtained by binarizing the voltage or the current; a rectangular wave detection circuit that detects a rising or falling timing and a cycle of the rectangular wave; a reference clock generation circuit that generates a reference clock based on the rising or falling timing and the cycle; and a control circuit that generates a control clock used to switch on and off by adjusting a phase or a duty ratio.

9 Claims, 13 Drawing Sheets

(56) References Cited

U.S. PATENT DOCUMENTS

| | | | |
|---|---|---|---|
| 2016/0336804 A1* | 11/2016 | Son | H02J 50/60 |
| 2017/0229923 A1 | 8/2017 | Shimokawa et al. | |
| 2017/0346346 A1 | 11/2017 | Shimokawa | |
| 2017/0373541 A1 | 12/2017 | Shimokawa et al. | |
| 2018/0097407 A1* | 4/2018 | Oshima | H02J 5/005 |
| 2019/0103768 A1 | 4/2019 | Uchida | |
| 2019/0235041 A1* | 8/2019 | Lee | H02J 50/90 |
| 2019/0372395 A1* | 12/2019 | Misawa | H02M 7/5387 |

FOREIGN PATENT DOCUMENTS

| | | |
|---|---|---|
| WO | 2016/071995 A1 | 5/2016 |
| WO | 2016/132559 A1 | 8/2016 |
| WO | 2016/132560 A1 | 8/2016 |
| WO | 2017/212516 A1 | 12/2017 |

* cited by examiner

FIG. 8

| RECEPTION VOLTAGE | PHASE |
|---|---|
| V1 | P1 |
| V2 | P2 |
| V3 | P3 |
| ... | ... |

FIG. 9

| PHASE DIFFERENCE | PHASE |
|---|---|
| PD1 | P1 |
| PD2 | P2 |
| PD3 | P3 |
| ... | ... | ns
POWER RECEIVER, POWER TRANSMISSION SYSTEM, AND POWER RECEIVING METHOD

CROSS-REFERENCE TO RELATED APPLICATION

This application is a continuation application of International Application PCT/JP2018/004672 filed on Feb. 9, 2018 and designated the U.S., the entire contents of which are incorporated herein by reference.

FIELD

The present embodiment discussed herein is related to a power receiver, a power transmission system, and a power receiving method.

BACKGROUND

There has been a wireless power receiving device that receives an electric signal including any one of an electric field, a magnetic field, or an electromagnetic field transmitted from a wireless power supply device and that includes a reception coil used to receive the electric signal and a first capacitor provided in series with the reception coil.

Japanese Laid-open Patent Publication No. 2012-055157 is disclosed as related art.

SUMMARY

According to an aspect of the embodiments, a power receiver includes: a secondary-side resonant coil that includes a resonant coil circuit and receives power from a primary-side resonant coil with magnetic field resonance or electric field resonance generated between the secondary-side resonant coil and the primary-side resonant coil; a capacitor inserted into the resonant coil circuit of the secondary-side resonant coil in series; a series circuit including a first switch and a second switch and coupled to the capacitor in parallel; a first rectifying element coupled to the first switch in parallel and having a first rectification direction; a second rectifying element coupled to the second switch in parallel and having a second rectification direction opposite to the first rectification direction; a detection circuit that detects a voltage or a current supplied to the secondary-side resonant coil; a binarization processing circuit that outputs a rectangular wave obtained by binarizing the voltage or the current detected by the detection circuit; a rectangular wave detection circuit that detects a rising or falling timing and a cycle of the rectangular wave output from the binarization processing circuit; a reference clock generation circuit that generates a reference clock on the basis of the rising or falling timing and the cycle of the rectangular wave detected by the rectangular wave detection circuit; and a control circuit that generates a control clock used to switch on and off of the first switch and the second switch by adjusting a phase or a duty ratio of the reference clock on the basis of the voltage or the current detected by the detection circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating table data for phase control;

FIG. 9 is a diagram illustrating table data for monitoring;

DESCRIPTION OF EMBODIMENTS

The wireless power receiving device further includes a switch and a second capacitor provided in series in a path parallel to the first capacitor and a control unit that controls on/off of the switch with a duty ratio in accordance with a frequency of the electric signal.

By the way, in wireless power supply, there is a case where phases and/or frequencies of resonance power of a power transmitter and a power receiver differ due to an influence of heat, other influences, or the like, and there is a case where it is not possible for the power receiver to efficiently receive the resonance power transmitted from the power transmitter.

Therefore, a power receiver, a power transmission system, and a power receiving method that can efficiently receive power may be provided.

An exemplary embodiment to which a power receiver, a power transmission system, and a power receiving method are applied will be described.

Embodiment

Before describing an embodiment to which a power receiver, a power transmission system, and a power receiving method are applied, an existing technology of a power receiver, a power transmission system, and a power receiving method according to an embodiment will be described with reference to FIGS. 1 to 3.

Figure 1:
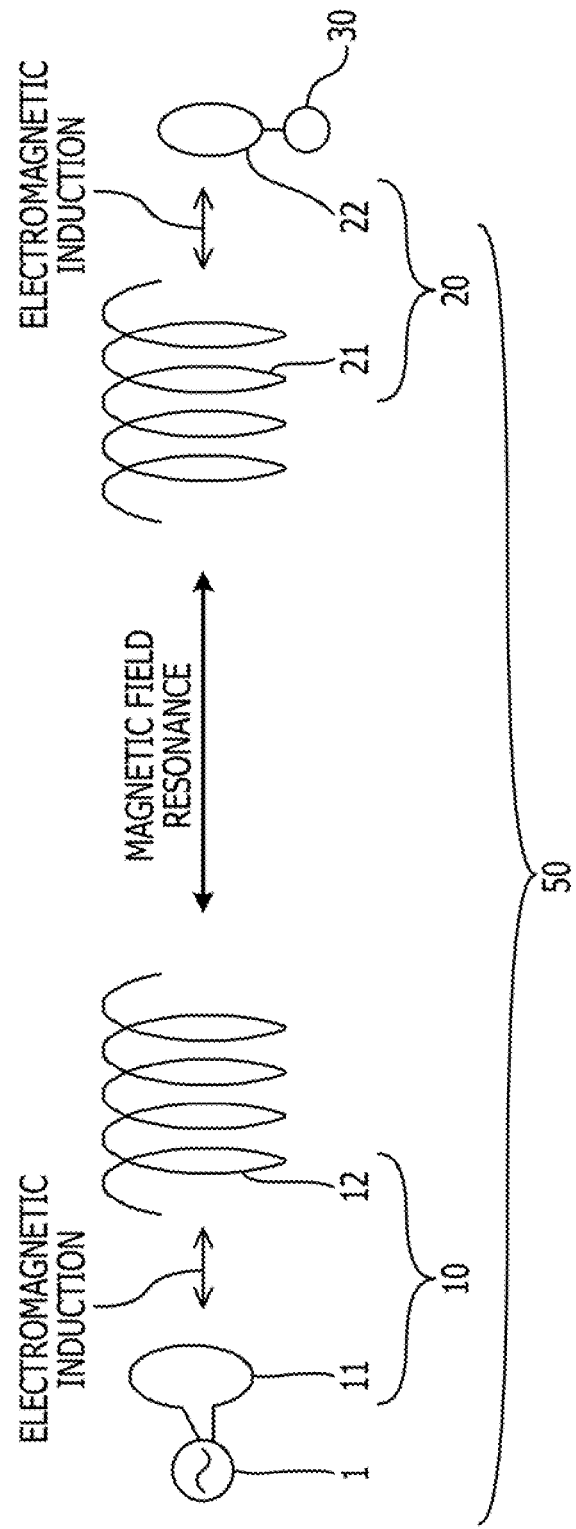
FIG. 1 is a diagram illustrating a power transmission system.

FIG. 1 is a diagram illustrating a power transmission system 50.

As illustrated in FIG. 1, the power transmission system 50 includes an alternating current (AC) power supply 1, a primary-side (power-transmitting-side) power transmitter 10, and a secondary-side (power-receiving-side) power receiver 20. The power transmission system 50 may include a plurality of power transmitters 10 and a plurality of power receivers 20.

The power transmitter 10 includes a primary-side coil 11 and a primary-side resonant coil 12. The power receiver 20 includes a secondary-side resonant coil 21 and a secondary-side coil 22. A load device 30 is connected to the secondary-side coil 22.

As illustrated in FIG. 1, the power transmitter 10 and the power receiver 20 achieve energy (electric power) transmission from the power transmitter 10 to the power receiver 20 with magnetic field resonance (magnetic field resonance) between the primary-side resonant coil (LC resonator) 12 and the secondary-side resonant coil (LC resonator) 21. Here, the power transmission from the primary-side resonant coil 12 to the secondary-side resonant coil 21 can be performed not only with the magnetic field resonance but also with electric field resonance (electric field resonance) or the like. The following description will be given mainly using the magnetic field resonance as an example.

Furthermore, in the embodiment, as an example, a case in which a frequency of an AC voltage to be output by the AC power supply 1 is 6.78 MHz, and a resonance frequency of the primary-side resonant coil 12 and the secondary-side resonant coil 21 is 6.78 MHz will be described.

Note that the power transmission from the primary-side coil 11 to the primary-side resonant coil 12 is performed using electromagnetic induction. Furthermore, the power transmission from the secondary-side resonant coil 21 to the secondary-side coil 22 is also performed using the electromagnetic Induction.

Furthermore, FIG. 1 illustrates a form in which the power transmission system 50 includes the secondary-side coil 22. However, it is sufficient that the power transmission system 50 do not include the secondary-side coil 22, and in this case, it is sufficient that the load device 30 be directly connected to the secondary-side resonant coil 21.

Figure 2:
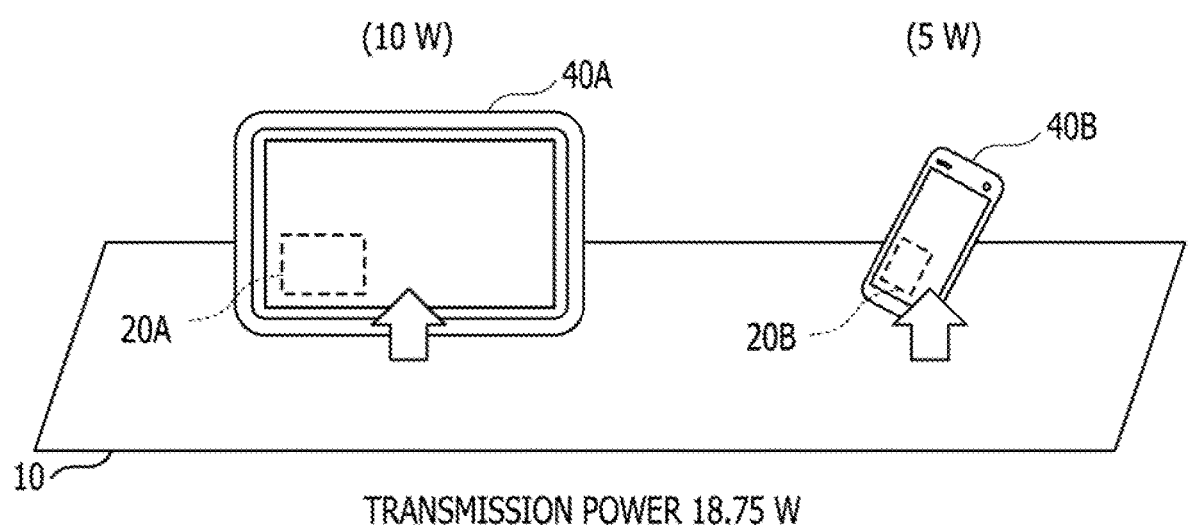
FIG. 2 is a diagram illustrating a state where a power transmitter transmits power to an electronic device with magnetic field resonance.

FIG. 2 is a diagram illustrating a state where the power transmitter 10 transmits power to electronic devices 40A and 40B by magnetic field resonance.

The electronic devices 40A and 40B are respectively a tablet computer and a smartphone and respectively include power receivers 20A and 20B therein. Each of the power receivers 20A and 208 has a configuration obtained by removing the secondary-side coil 22 from the power receiver 20 (refer to FIG. 1) illustrated in FIG. 2. For example, each of the power receivers 20A and 20B includes the secondary-side resonant coil 21. Note that the power transmitter 10 is simplified in FIG. 2. However, the power transmitter 10 is connected to the AC power supply 1 (refer to FIG. 1).

In FIG. 2, the electronic devices 40A and 40B are disposed at positions at an equal distance from the power transmitter 10. The power receivers 20A and 20B respectively included in the electronic devices 40A and 40B simultaneously receive power from the power transmitter 10 with the magnetic field resonance in a non-contact state.

Here, as an example, in the state illustrated in FIG. 2, it is assumed that a power reception efficiency of the power receiver 20A included in the electronic device 40A be 40% and a power reception efficiency of the power receiver 20B included in the electronic device 40B be 40%.

The power reception efficiency of each of the power receivers 20A and 20B is represented by a ratio of power received by the secondary-side coil 22 of each of the power receivers 20A and 20B with respect to power transmitted from the primary-side coil 11 connected to the AC power supply 1. Note that, in a case where the power transmitter 10 does not include the primary-side coil 11 and the primary-side resonant coil 12 is directly connected to the AC power supply 1, it is sufficient that received power be obtained by using the power transmitted from the primary-side resonant coil 12 instead of the power transmitted from the primary-side coil 11. Furthermore, in a case where the power receivers 20A and 200 do not include the secondary-side coil 22, it is sufficient that the received power be obtained by using power received by the secondary-side resonant coil 21 instead of the power received by the secondary-side coil 22.

The power reception efficiency of each of the power receivers 20A and 20B is determined according to coil specifications and postures of the power transmitter 10 and the power receivers 20A and 20B and a distance between the power transmitter 10 and each of the power receivers 20A and 208. In FIG. 2, the power receivers 20A and 20B have the same configurations, and the power receivers 20A and 20B are disposed at an equal distance and an equal posture from the power transmitter 10. Therefore, the power reception efficiencies of the power receivers 20A and 20B are equal to each other, and for example, the power reception efficiency is 40%.

Furthermore, it is assumed that a rated output of the electronic device 40A be 10 W and a rated output of the electronic device 40B be five W.

In such a case, the power transmitted from the primary-side resonant coil 12 of the power transmitter 10 (refer to FIG. 1) is 18.75 W. The power of 18.75 W is obtained by (10 W+5 W)/(40%+40%).

By the way, when the power of 18.75 W is transmitted from the power transmitter 10 to the electronic devices 40A and 40B, the power receivers 20A and 20B receive power of 15 W in total. Since the power is equally transmitted to the power receivers 20A and 208, each of the power receivers 20A and 20B receives power of 7.5 W.

This results a lack of power of 2.5 W for the electronic device 40A and an excess of power of 2.5 W for the electronic device 40B.

For example, even if the power transmitter 10 transmits the power of 18.75 W to the electronic devices 40A and 40B, it is not possible for the electronic devices 40A and 40B to receive the power in a well-balanced manner. In other words, a power supply balance at the time when the electronic devices 40A and 40B simultaneously receive power is lost.

Figure 3:
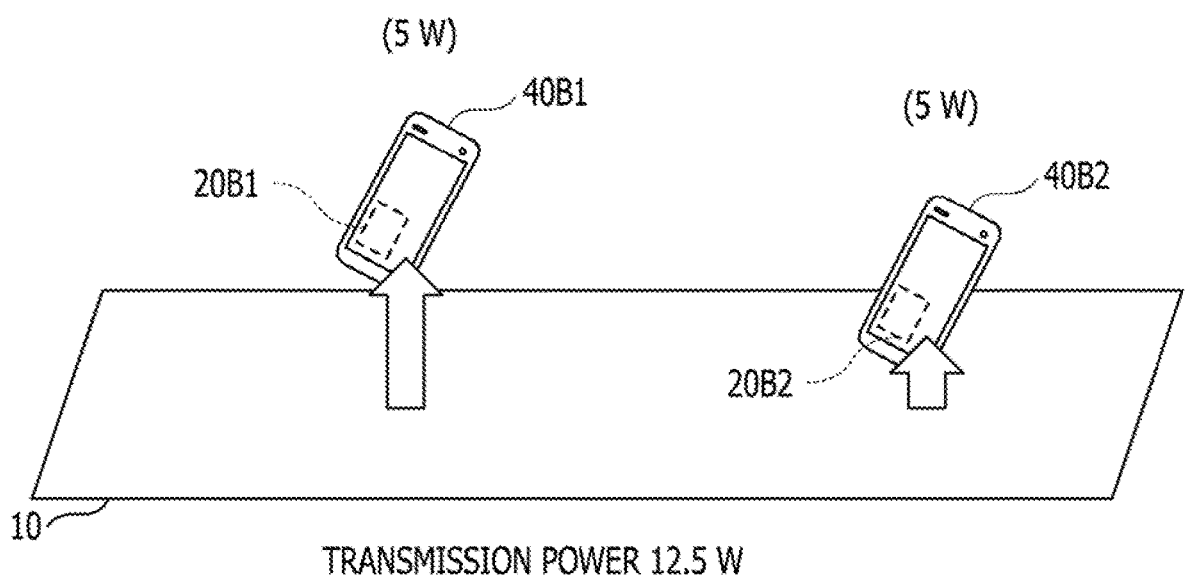
FIG. 3 is a diagram illustrating a state where the power transmitter transmits power to the electronic device with the magnetic field resonance.

FIG. 3 is a diagram illustrating a state where the power transmitter transmits power to electronic devices 40B1 and 40B2 with the magnetic field resonance.

The electronic devices 40B1 and 402 are smartphones of the same type and respectively include power receivers 20B1 and 20B2. The power receivers 201 and 2062 are equal to the power receiver 208 illustrated in FIG. 2. For example, each of the power receivers 20B1 and 20B2 includes the secondary-side resonant coil 21. Note that the power transmitter 10 is simplified in FIG. 3. However, the power transmitter 10 is connected to the AC power supply 1 (refer to FIG. 1).

In FIG. 3, although the electronic devices 40B1 and 40B2 are disposed as having the same angles (posture) with respect to the power transmitter 10, the electronic device 40B1 is disposed away from the power transmitter 10 than the electronic device 40B2. The power receivers 2061 and 2062 respectively included in the electronic devices 40B1 and 402 simultaneously receive power from the power transmitter 10 with the magnetic field resonance in a non-contact state.

Here, as an example, in the state illustrated in FIG. 3, it is assumed that a power reception efficiency of the power receiver 20B1 included in the electronic device 40B1 be 35% and a power reception efficiency of the power receiver 20B2 included in the electronic device 40B2 be 45%.

Here, since the angles (posture) of the electronic devices 40B1 and 40B2 with respect to the power transmitter 10 are equal to each other, the power reception efficiencies of the power receivers 20B1 and 20B2 are determined according to distances between the power transmitter 10 and the power receivers 20B1 and 20B2. Therefore, in FIG. 3, the power reception efficiency of the power receiver 20B1 is lower than the power reception efficiency of the power receiver 20B2. Note that a rated output of each of the electronic devices 40B1 and 40B2 is five W.

In such a case, the power transmitted from the primary-side resonant coil 12 of the power transmitter 10 (refer to FIG. 1) is 12.5 W. The power of 12.5 W is obtained by (5 W+5 W)/(35%+45%).

By the way, when the power transmitter 10 transmits the power of 12.5 W to the electronic devices 40B1 and 40B2, the power receivers 20B1 and 20B2 receive power of 10 W in total. Furthermore, in FIG. 3, the power reception efficiency of the power receiver 20I is 35%, and the power reception efficiency of the power receiver 20B2 is 45%. Therefore, the power receiver 20B1 receives power of about 4.4 W, and the power receiver 20B2 receives power of about 5.6 W.

This results a lack of power of about 0.6 W for the electronic device 40B1 and an excess of power of 0.6 W for the electronic device 40B2.

For example, even if the power transmitter 10 transmits the power of 12.5 W to the electronic devices 40B1 and 40B2, it is not possible for the electronic devices 40B1 and 40B2 to receive the power in a well-balanced manner. In other words, a power supply balance at the time when the electronic devices 40B1 and 40B2 simultaneously receive power is lost (there is room for improvement).

Here, note that the power supply balance in a case where the angles (posture) of the electronic devices 40B1 and 40B2 with respect to the power transmitter 10 are equal to each other and the distances from the electronic devices 40B1 and 40B2 to the power transmitter 10 are different from each other has been described.

However, the power reception efficiency is determined according to the distance and the angle (posture) between the power transmitter 10 and each of the power receivers 20B1 and 20B2. Therefore, if the angles (posture) of the electronic devices 40B1 and 40B2 in the positional relationship illustrated in FIG. 3 differ, the power reception efficiencies of the power receivers 20B1 and 20B2 are respectively different from 35% and 45% described above.

Furthermore, even when the distances between the electronic devices 40B1 and 40B2 and the power transmitter 10 are equal to each other, if the angles (posture) of the electronic devices 40B1 and 40B2 with respect to the power transmitter 10 are different from each other, the power reception efficiencies of the power receivers 20B1 and 20B2 are different from each other.

As described above, as illustrated in FIG. 2, when power is simultaneously transmitted with the magnetic field resonance from the power transmitter 10 to the electronic devices 40A and 40B having different rated outputs, it is difficult for the electronic devices 40A and 40B to receive power in a well-balanced manner.

Furthermore, as illustrated in FIG. 3, even if the rated outputs of the electronic devices 40B1 and 40B2 are equal to each other, when the angles (posture) of the electronic devices 40B1 and 40B2 with respect to the power transmitter 10 are different from each other, the power reception efficiencies of the power receivers 20B1 and 20B2 are different from each other. Therefore, it is difficult for the electronic devices 40B1 and 40B2 to receive power in a well-balanced manner.

By the way, there is a case where the phase and/or the frequency of the resonance power of the power transmitter 10 are different from those of the power receiver 20 due to an influence of heat, other influences, or the like, and there is a case where it is not possible for the power receiver 20 or the like to efficiently receive the resonance power transmitted from the power transmitter 10. For efficient power reception by the power receiver 20, it is preferable to cause resonance in accordance with the phase and the frequency of the resonance power transmitted from the power transmitter 10. Note that this is similarly applied between the power transmitter 10 and each of the power receivers 20A, 20B, 20B1, and 20B2.

Next, a power receiver, a power transmission system, and a power receiving method according to the embodiment will be described with reference to FIGS. 4 to 12.

Figure 4:
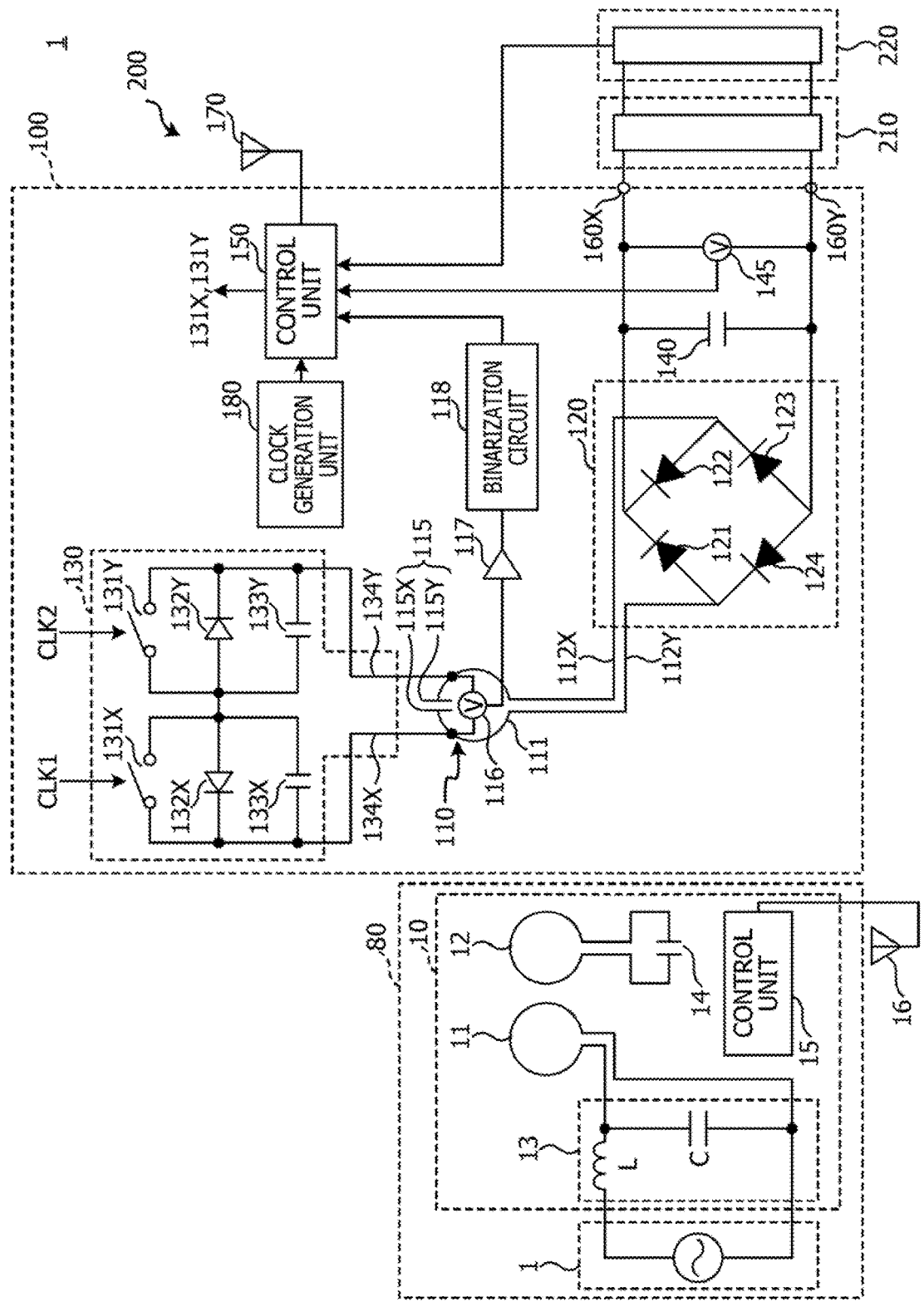
FIG. 4 is a diagram illustrating a power receiver and a power transmission device according to an embodiment.

FIG. 4 is a diagram illustrating a power transmission system 1 including an electronic device 200 and a power transmitter 80 according to the embodiment. The power transmitter 80 includes the AC power supply 1 and the power transmitter 10. The AC power supply 1 and the power transmitter 10 are similar to those illustrated in FIG. 1, and more specific configurations of the AC power supply 1 and the power transmitter 10 are illustrated in FIG. 4. The electronic device 200 includes a power receiver 100, a direct current (DC)-DC converter 210, and a battery 220.

The power transmitter 10 includes the primary-side coil 11, the primary-side resonant coil 12, a matching circuit 13, a capacitor 14, a control unit 15, and an antenna 16.

The power receiver 100 includes a secondary-side resonant coil 110, a capacitor 115, a voltmeter 116, a first stage amplifier 117, a binarization circuit 118, a rectifier circuit 120, an adjuster 130, a smoothing capacitor 140, a voltmeter 145, a control device 150, output terminals 160X and 160Y, an antenna 170, and a clock generation unit 180. The DC-DC converter 210 is connected to the output terminals 160X and 160Y, and the battery 220 is connected to the output side of the DC-DC converter 210.

First, the power transmitter 10 will be described. As illustrated in FIG. 4, the primary-side coil 11 is a loop-shaped coil, and is connected at its two ends to the AC power supply 1 via the matching circuit 13. The primary-side coil 11 is disposed in close proximity to the primary-side resonant coil 12 in a non-contact manner, and is electromagnetically coupled to the primary-side resonant coil 12. The primary-side coil 11 is disposed so that its central axis is aligned with the central axis of the primary-side resonant coil 12. The central axes are aligned with each other for the purpose of improving coupling strength between the primary-side coil 11 and the primary-side resonant coil 12 and suppressing leakage of magnetic flux to suppress generation of an unnecessary electromagnetic field around the primary-side coil 11 and the primary-side resonant coil 12.

The primary-side coil 11 generates a magnetic field by AC power supplied from the AC power supply 1 via the matching circuit 13, and transmits the power to the primary-side resonant coil 12 with electromagnetic induction (mutual induction).

As Illustrated in FIG. 4, the primary-side resonant coil 12 is disposed in close proximity to the primary-side coil 11 in a non-contact manner, and is electromagnetically coupled to the primary-side coil 11. Furthermore, the primary-side resonant coil 12 is designed to have a predetermined resonance frequency and a high Q value. The resonance frequency of the primary-side resonant coil 12 is set to be equal to a resonance frequency of the secondary-side resonant coil 110. The capacitor 14 for adjusting the resonance frequency is connected in series between both ends of the primary-side resonant coil 12.

The resonance frequency of the primary-side resonant coil 12 is set to be the same frequency as a frequency of the AC power output by the AC power supply 1. The resonance frequency of the primary-side resonant coil 12 is determined according to an inductance of the primary-side resonant coil 12 and a capacitance of the capacitor 14. Therefore, the inductance of the primary-side resonant coil 12 and the capacitance of the capacitor 14 are set such that the resonance frequency of the primary-side resonant coil 12 becomes the same as the frequency of the AC power output from the AC power supply 1.

The matching circuit 13 is inserted for impedance matching between the primary-side coil 11 and the AC power supply 1, and Includes an inductor L and a capacitor C.

The AC power supply 1 is a power supply that outputs AC power having a frequency need for the magnetic field resonance, and includes an amplifier that amplifies the output power. The AC power supply 1 outputs, for example, high-frequency AC power of about several hundreds of kHz to several tens of MHz.

The capacitor 14 is a variable capacity capacitor inserted in series between the both ends of the primary-side resonant coil 12. The capacitor 14 is provided to adjust the resonance frequency of the primary-side resonant coil 12, and the control unit 15 sets the capacitance.

The control unit 15 performs control of an output voltage and an output frequency of the AC power supply 1, control of the capacitance of the capacitor 14, or the like. Furthermore, the control unit 15 performs data communication with the power receiver 100 via the antenna 16.

The power transmitter 80 described above transmits the AC power, which is supplied from the AC power supply 1 to the primary-side coil 11, to the primary-side resonant coil 12 with the magnetic induction, and transmits the power from the primary-side resonant coil 12 to the secondary-side resonant coil 110 of the power receiver 100 with the magnetic field resonance.

Next, the secondary-side resonant coil 110 included in the power receiver 100 will be described. Here, as an example, a form in which the resonance frequency is 6.78 MHz will be described.

The secondary-side resonant coil 110 is designed to have the same resonance frequency as that of the primary-side resonant coil 12 and a high Q value. The secondary-side resonant coil 110 includes a resonant coil unit 111 and terminals 112X and 112Y. Here, the resonant coil unit 111 is substantially the secondary-side resonant coil 110. However, here, a resonant coil unit in which the terminals 112X and 112Y are provided at both ends of the resonant coil unit 111 is used as the secondary-side resonant coil 110.

In the resonant coil unit 111, the capacitor 115 for adjusting the resonance frequency is inserted in series. Furthermore, the adjuster 130 is connected in parallel to the capacitor 115. Furthermore, the terminals 112X and 112Y are provided at both ends of the resonant coil unit 111. The terminals 112X and 112Y are connected to the rectifier circuit 120. The terminals 112X and 112Y are respectively examples of a first terminal and a second terminal.

The secondary-side resonant coil 110 is connected to the rectifier circuit 120 without via the secondary-side coil. When the secondary-side resonant coil 110 is in a state where resonance may occur by the adjuster 130, AC power transmitted from the primary-side resonant coil 12 of the power transmitter 10 with the magnetic field resonance is output to the rectifier circuit 120.

The capacitor 115 is inserted into the resonant coil unit 111 in series so as to adjust the resonance frequency of the secondary-side resonant coil 110. The capacitor 115 includes terminals 115X and 115Y. The adjuster 130 is connected to the capacitor 115 in parallel.

The voltmeter 116 is connected to the capacitor 115 in parallel and measures a voltage across both terminals of the capacitor 115. The voltmeter 116 detects a voltage of the AC power received by the secondary-side resonant coil 110 and transmits a signal indicating the voltage to the control device 150 via the first stage amplifier 117 and the binarization circuit 118. The AC voltage measured by the voltmeter 116 is used to generate driving signals that drive switches 131X and 131Y. The voltmeter 116 is an example of a first detection unit. Note that the voltage may be measured from a current waveform by using an ammeter instead of the voltmeter 116.

The first stage amplifier 117 is provided between the voltmeter 116 and the binarization circuit 118 and is provided to ensure isolation of a circuit on the side of the binarization circuit 118 as viewed from the voltmeter 116. When the side of the first stage amplifier 117 is viewed from the voltmeter 116, a high-impedance (Hi-Z) state is made. Such a first stage amplifier 117 is provided so as not to affect a resonance state of the secondary-side resonant coil 110.

The binarization circuit 118 binarizes a high-frequency sine wave signal input from the first stage amplifier 117 and outputs the signal to the control device 150. The binarization circuit 118 has a threshold used to divide a signal level of the high-frequency sine wave signal into one and zero, and generates a rectangular wave signal from the high-frequency sine wave signal and outputs the signal to the control device 150. The binarization circuit 118 is an example of a binarization processing unit.

A frequency of the rectangular wave signal output from the binarization circuit 118 is equal to a frequency of the high-frequency sine wave signal output from the first stage amplifier 117. For example, the frequency of the rectangular wave signal output from the binarization circuit 118 is equal to the resonance frequency of the secondary-side resonant coil 110.

The rectifier circuit 120 includes four diodes 121 to 124. The diodes 121 to 124 are connected in a bridge-like manner. The diodes 121 to 124 rectify all waves of power input from the secondary-side resonant coil 110 and output the rectified power.

The adjuster 130 is connected to the capacitor 115 in parallel in the resonant coil unit 111 of the secondary-side resonant coil 110.

The adjuster 130 includes the switches 131X and 131Y, diodes 132X and 132Y, capacitors 133X and 133Y, and terminals 134X and 134Y.

The switches 131X and 131Y are connected in series between the terminals 134X and 134Y. The switches 131X and 131Y are respectively examples of a first switch and a second switch. The terminals 134X and 134Y are respectively connected to the terminals 115X and 115Y of the capacitor 115. Therefore, a series circuit including the switches 131X and 131Y is connected to the capacitor 115 in parallel.

The diode 132X and the capacitor 133X are connected to the switch 131X in parallel. The diode 132Y and the capacitor 133Y are connected to the switch 131Y in parallel.

Anodes of the diodes 132X and 132Y are connected to each other, and cathodes are connected to the capacitor 115. For example, the diodes 132X and 132Y are connected to each other so that rectification directions are opposite to each other.

Note that the diodes 132X and 132Y are respectively examples of a first rectifying element and a second rectifying element. Furthermore, it is sufficient that the adjuster 130 do not include the capacitors 133X and 133Y.

As the switch 131X, the diode 132X, and the capacitor 133X, for example, a field effect transistor (FET) can be used. It is sufficient that connection be made so that a body diode between a drain and a source of a P-channel or an N-channel FET has a rectification direction which is the same as that of the diode 132X. In a case where the N-channel FET is used, the source is an anode of the diode 132X, and the drain is a cathode of the diode 132X.

Furthermore, the switch 131X is realized by switching connection states between the drain and the source by inputting the driving signal output from the control device 150 to a gate. Furthermore, the capacitor 133X can be realized by a parasitic capacitance between the drain and the source.

Similarly, as the switch 131Y, the diode 132Y, and the capacitor 133Y, for example, a FET can be used. It is sufficient that connection be made so that the body diode between the drain and the source of the P-channel or the N-channel FET has a rectification direction which is the same as that of the diode 132B. In a case where the N-channel FET is used, the source is an anode of the diode 132Y, and the drain is a cathode of the diode 132Y.

Furthermore, the switch 131Y is realized by switching connection states between the drain and the source by inputting the driving signal output from the control device 150 to a gate. Furthermore, the capacitor 133Y can be realized by a parasitic capacitance between the drain and the source.

Note that the switch 131X, the diode 132X, and the capacitor 133X are not limited to those realized by the FET, and may be realized by connecting the switch, the diode, and the capacitor in parallel. The same applies to the switch 131Y, the diode 132Y, and the capacitor 133Y.

On/off of the switches 131X and 131Y are switched in a state where phases of the switches 131X and 131Y are opposite to each other. When the switch 131X is turned off and the switch 131Y is turned on, a resonance current flows from the terminal 134X toward the terminal 134Y via the capacitor 133X and the switch 131Y in the adjuster 130, and the capacitor 115 is in a state where a resonance current may flow from the terminal 115X to the terminal 115Y. For example, in FIG. 4, the resonance current may flow in a clockwise direction in the secondary-side resonant coil 110.

Furthermore, when the switch 131X is turned on and the switch 131Y is turned off, a current path from the terminal 134X toward the terminal 134Y via the switch 131X and the diode 132Y is generated in the adjuster 130. Since the current path is parallel to the capacitor 115, the current does not flow through the capacitor 115.

Therefore, when a state where the switch 131X is turned off, the switch 131Y is turned on, and the resonance current flows in the clockwise direction in the secondary-side resonant coil 110 is switched to a state where the switch 131X Is turned on and the switch 131Y is turned off, the resonance current is not generated. This is because the current path does not include the capacitor.

Furthermore, when the switch 131X is turned on and the switch 131Y is turned off, the resonance current flows from the terminal 134Y toward the terminal 134X via the capacitor 133Y and the switch 131X in the adjuster 130, and the capacitor 115 is in a state where the resonance current may flow from the terminal 115Y to the terminal 11X. For example, in FIG. 4, the resonance current may flow in a counterclockwise direction in the secondary-side resonant coil 110.

Furthermore, when the switch 131X is turned off and the switch 131Y is turned on, the current path from the terminal 134Y toward the terminal 134X via the switch 131Y and the diode 132X is generated in the adjuster 130. Since the current path is parallel to the capacitor 115, the current does not flow through the capacitor 115.

Therefore, when a state where the switch 131X is turned on, the switch 131Y is turned off, and the resonance current flows in the counterclockwise direction in the secondary-side resonant coil 110 is switched to a state where the switch 131X is turned off and the switch 131Y is turned on, the resonance current is not generated. This is because the current path does not include the capacitor.

The adjuster 130 switches the state where the resonance current may be generated and the state where the resonance current is not generated by switching the switches 131X and 131Y as described above. The switches 131X and 131Y are switched by the driving signals output from the control device 150.

A frequency of the driving signal is set to be an AC frequency received by the secondary-side resonant coil 110.

The switches 131X and 131Y cut off an AC current at a high frequency as described above. For example, the adjuster 130 that is a combination of two FETs can cut off the AC current at high speed. Note that an operation of the adjuster 130 will be described with reference to FIG. 5.

The smoothing capacitor 140 is connected to an output side of the rectifier circuit 120. The smoothing capacitor 140 smooths all waves of the power rectified by the rectifier circuit 120, and outputs the smoothed power as DC power. The output side of the smoothing capacitor 140 is connected to the output terminals 160X and 160Y. The power of which all the waves are rectified by the rectifier circuit 120 can be treated as substantial AC power because a negative component of the AC power is inverted into a positive component. However, the use of the smoothing capacitor 140 enables to obtain stable DC power even in a case where the power of which all the waves are rectified contains a ripple.

Note that a line connecting the upper terminal of the smoothing capacitor 140 and the output terminal 160X is a line on the higher voltage side, and a line connecting the lower terminal of the smoothing capacitor 140 and the output terminal 160Y is a line on the lower voltage side.

The voltmeter 145 is connected between the output terminals 160X and 160Y. The voltmeter 145 is used by the control device 150 to calculate the received power of the power receiver 100. When the received power is obtained on the basis of a voltage (reception voltage) measured by the voltmeter 145 and an internal resistance value R of the battery 220, a loss is less than that in a case where the received power is measured by measuring a current. Therefore, this is a preferred measuring method. However, the received power of the power receiver 100 may be obtained by measuring a current and a voltage. In a case where the current is measured, it is sufficient that the current be measured by using a Hall element, a magnetic resistance element, a detection coil, a resistor, or the like.

The control device 150 operates on the basis of an internal clock input from the clock generation unit 180. To the control device 150, data indicating the voltage of the AC power detected by the voltmeter 116, the voltage measured by the voltmeter 145 (reception voltage), and the voltage of the battery 220 (charge voltage) is input.

The control device 150 holds data indicating a rated output of the battery 220 in an internal memory. Furthermore, the power received by the power receiver 100 from the power transmitter 10 (received power) is measured in response to a request from the control unit 15 of the power transmitter 10, and the data indicating the received power is transmitted to the power transmitter 10 via the antenna 170.

Furthermore, when receiving data indicating a phase difference from the power transmitter 10, the control device 150 generates a driving signal by using the received phase difference and drives the switches 131X and 131Y. Note that it is sufficient that the received power be obtained by the control device 150 on the basis of the voltage (reception voltage) V measured by the voltmeter 145 and the internal resistance value R of the battery 220. Received power P is obtained by $P=V^2/R$.

Furthermore, the control device 150 generates clocks CLK1 and CLK2 for respectively driving the switches 131X and 131Y on the basis of the power received from the power transmitter 80. Details of an internal configuration of the control device 150 and control processing executed by the control device 150 to generate the clocks CLK1 and CLK2 will be described later with reference to FIG. 6.

The clock generation unit 180 generates an internal clock used for an operation by the control device 150. The clock generation unit 180 includes a crystal oscillator therein. The internal clock is an example of a control clock, and the clock generation unit 180 is an example of a control clock generation unit.

The DC-DC converter 210 is connected to the output terminals 160X and 160Y, and converts a voltage of DC power output from the power receiver 100 into the rated voltage of the battery 220 and outputs the converted rated voltage. In a case where the output voltage of the rectifier circuit 120 is higher than the rated voltage of the battery 220, the DC-DC converter 210 steps down the output voltage of the rectifier circuit 120 to the rated voltage of the battery 220. Furthermore, in a case where the output voltage of the rectifier circuit 120 is lower than the rated voltage of the battery 220, the DC-DC converter 210 boosts the output voltage of the rectifier circuit 120 to the rated voltage of the battery 220.

The battery 220 may be any rechargeable secondary battery, and a lithium-ion battery can be used, for example. Here, since the electronic device 200 including the power receiver 100 is a tablet computer, a smartphone, or the like, the battery 220 is a main battery of the tablet computer, the smartphone, or the like.

Note that the primary-side coil 11, the primary-side resonant coil 12, and the secondary-side resonant coil 110 are produced by winding a copper wire, for example. However, the material of the primary-side coil 11, the primary-side resonant coil 12, and the secondary-side resonant coil 110 may be any metal (for example, gold, aluminum, and the like) other than copper. Furthermore, the materials of the primary-side coil 11, the primary-side resonant coil 12, and the secondary-side resonant coil 110 may be different from each other.

In such a configuration, the primary-side coil 11 and the primary-side resonant coil 12 are on the power transmission side, and the secondary-side resonant coil 110 is on the power reception side.

According to the magnetic field resonance method, power is transmitted from the power transmission side to the power reception side using the magnetic field resonance occurring between the primary-side resonant coil 12 and the secondary-side resonant coil 110. Therefore, longer-distance power transmission can be performed than the electromagnetic induction method for transmitting power from the power transmission side to the power reception side by electromagnetic induction.

With regard to a distance or positional deviation between two resonant coils, the magnetic field resonance method has a higher degree of freedom than the electromagnetic induction method, and has a merit of being free of position.

Next, current paths when the switches 131X and 131Y are driven by the driving signals will be described with reference to FIG. 5.

Figure 5:
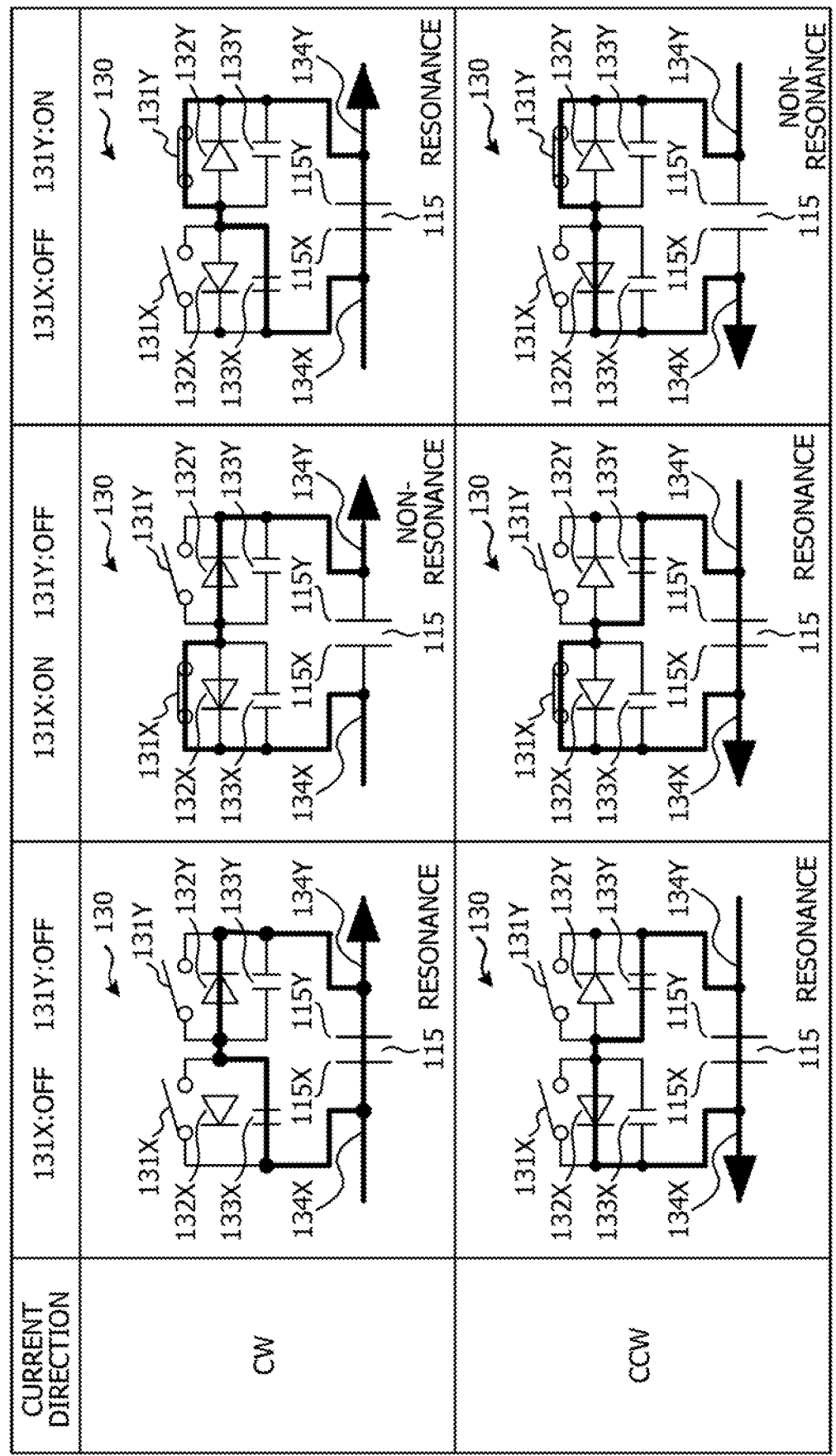
FIG. 5 is a diagram illustrating current paths in a capacitor and an adjuster.

FIG. 5 is a diagram illustrating the current paths in the capacitor 115 and the adjuster 130. In FIG. 5, as in FIG. 4, a direction of a current flowing from the terminal 134X to the terminal 134Y through the inside of the capacitor 115 or the adjuster 130 is referred to as a clockwise (CW) direction. Furthermore, a direction of a current flowing from the terminal 134Y to the terminal 134X through the inside of the capacitor 115 or the adjuster 130 is referred to as a counterclockwise (CCW) direction.

First, in a case where the switches 131X and 131Y are turned off and the current flows in the CW direction, the resonance current flows in a direction from the terminal 134X toward the terminal 134Y via the capacitor 133X and the diode 132Y, and the resonance current flows in the capacitor 115 in a direction from the terminal 115X to the terminal 115Y. Therefore, the resonance current flows in the clockwise direction in the secondary-side resonant coil 110.

In a case where the switches 131X and 131Y are turned off and the current flows in the CCW direction, the resonance current flows in a direction from the terminal 134Y toward the terminal 134X via the capacitor 133Y and the diode 132X, and the resonance current flows in the capacitor 115 in a direction from the terminal 115Y to the terminal 115X. Therefore, the resonance current flows in the counterclockwise direction in the secondary-side resonant coil 110.

In a case where the switch 131X is turned on, the switch 131Y is turned off, and the current flows in the CW direction, a current path is generated, in the adjuster 130, from the terminal 134X toward the terminal 134Y via the switch 131X and the diode 132Y. Since the current path is parallel to the capacitor 115, the current does not flow through the capacitor 115. Therefore, no resonance current flows in the secondary-side resonant coil 110. Note that, in this case, even when the switch 131Y is turned on, no resonance current flows in the secondary-side resonant coil 110.

In a case where the switch 131X is turned on, the switch 131Y is turned off, and the current flows in the CCW direction, the resonance current flows in a direction from the terminal 134Y toward the terminal 134X via the capacitor 133Y and the switch 131X in the adjuster 130, and the resonance current flows in the capacitor 115 in the direction from the terminal 115Y to the terminal 115X. Therefore, the resonance current flows in the counterclockwise direction in the secondary-side resonant coil 110. Note that a current also flows in the diode 132X which is in parallel to the switch 131X.

In a case where the switch 131X is turned off, the switch 131Y is turned on, and the current flows in the CW direction, the resonance current flows in the direction from the terminal 134X toward the terminal 134Y via the capacitor 133X and the switch 131Y in the adjuster 130, and the resonance current flows in the capacitor 115 in the direction from the terminal 115X to the terminal 115Y. Therefore, the resonance current flows in the clockwise direction in the secondary-side resonant coil 110. Note that a current also flows in the diode 132Y which is in parallel to the switch 131Y.

In a case where the switch 131X is turned off, the switch 131Y is turned on, and the current flows in the CCW direction, the current path is generated, in the adjuster 130, from the terminal 134Y toward the terminal 134X via the switch 131Y and the diode 132X. Since the current path is parallel to the capacitor 115, the current does not flow through the capacitor 115. Therefore, no resonance current flows in the secondary-side resonant coil 110. Note that, in this case, even when the switch 131X is turned on, no resonance current flows in the secondary-side resonant coil 110.

Note that a capacitance that contributes to the resonance frequency of the resonance current is determined by the capacitor 115 and the capacitor 132X or 132Y. Therefore, it is desirable that the capacitances of the capacitors 132X and 132Y be equal to each other.

The power receiver 100 receives power in a state where the resonance current flows in the secondary-side resonant coil 110 by using the state where the switch 131X is turned on and the switch 131Y is turned off and the state where the switch 131X is turned off and the switch 131Y is turned on by using the clocks CLK1 and CLK2.

By the way, there is a case where the phase and/or the frequency of the resonance power of the power transmitter 10 are different from those of the power receiver 20 due to an influence of heat, other influences, or the like, and there is a case where it is not possible for the power receiver 20 or the like to efficiently receive the resonance power transmitted from the power transmitter 10. For efficient power reception by the power receiver 20, it is preferable to cause resonance in accordance with the phase and the frequency of the resonance power transmitted from the power transmitter 10.

As a specific example in which the phases and/or the frequencies of the resonance power are different from each other, there is a case where the resonance power received by the power receiver 20 includes a beat component. When it is assumed that a frequency of resonance generated in the primary-side resonant coil 12 of the power transmitter 10 be $f_{TX}$ and a frequency of resonance generated in the secondary-side resonant coil 110 of the power receiver 100 be $f_{RX}$, a frequency f of the beat is $f=|f_{TX}-f_{RX}|$.

In simulation, it is found that, when the frequency $f_{TX}$ shifts with respect to the frequency $f_{RX}$ by 0.1% from a state where the power receiver 100 switches the switches 131X and 131Y in synchronization with a design value of the frequency $f_{TX}$ of the resonance of the power transmitter 10, the received power of the power receiver 100 is greatly reduced.

In the embodiment, to suppress such reduction in the reception voltage, the power receiver 100 generates the clocks CLK1 and CLK2 on the basis of the received power.

Figure 6:
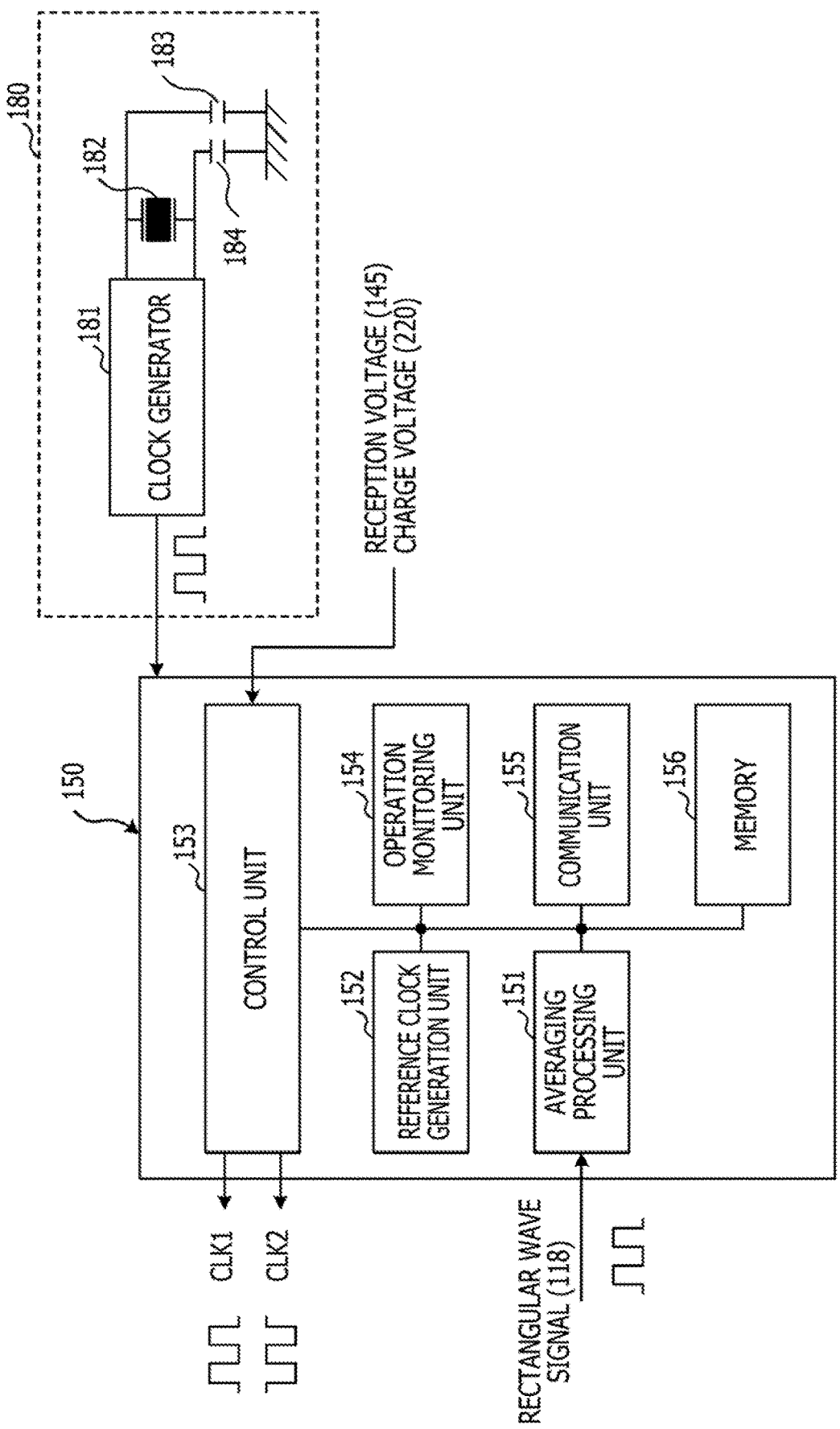
FIG. 6 is a diagram illustrating an internal configuration of a control device and a clock generation unit.

Next, the control device 150 will be described with reference to FIG. 6. FIG. 6 is a diagram illustrating an internal configuration of the control device 150 and the clock generation unit 180. Here, processing for generating the clocks CLK1 and CLK2 used to drive the switches 131X and 131Y by the control device 150 will be described.

The control device 150 includes an averaging processing unit 151, a reference clock generation unit 152, a control unit 153, an operation monitoring unit 154, a communication unit 155, and a memory 156. The control device 150 is a microcomputer that includes a central processing unit (CPU), a random access memory (RAM), a read only memory (ROM), a non-volatile memory, and the like.

The averaging processing unit 151, the reference clock generation unit 152, the control unit 153, the operation monitoring unit 154, and the communication unit 155 are functions (function) of a program executed by the control device 150 as functional blocks. Furthermore, the memory 156 functionally represents a memory of the control device 150.

The clocks generated by the clock generation unit 180 are input to the averaging processing unit 151, the reference clock generation unit 152, the control unit 153, the operation monitoring unit 154, the communication unit 155, and the memory 156 as internal clocks. The internal clock is an example of a system clock or a control clock used by the control device 150 for control processing.

Here, first, the internal configuration of the clock generation unit 180 will be described. The clock generation unit 180 includes a clock generator 181, a crystal oscillator 182, and capacitors 183 and 184.

The clock generator 181 generates the internal clock on the basis of oscillation of the crystal oscillator 182 at a predetermined frequency. A frequency of the internal clock is obtained by multiplying the oscillation frequency of the crystal oscillator 182. For example, the frequency of the internal clock is a frequency higher than the resonance frequency of the secondary-side resonant coil 110 by about one digit.

The crystal oscillator 182 is grounded via the capacitors 183 and 184, oscillates at a predetermined frequency, and makes an input to the clock generator 181.

The averaging processing unit 151 counts a cycle of the rectangular wave signal input from the binarization circuit 118 by using the internal clock, averages the plurality of counted cycles, and outputs data indicating the averaged cycle to the reference clock generation unit 152. The averaging processing unit 151 is an example of a rectangular wave detection unit that detects a timing of rising or falling and the cycle of the rectangular wave signal output from the binarization circuit 118. Note that details of processing of the averaging processing unit 151 will be described later with reference to FIG. 7.

The reference clock generation unit 152 generates a reference clock to be a reference of the clocks CLK1 and CLK2 respectively used to drive the switches 131X and 131Y on the basis of the cycle obtained by the averaging processing unit 151. The reference clock generated by the reference clock generation unit 152 is input to the control unit 153. Note that details of processing of the reference clock generation unit 152 will be described later with reference to FIG. 7.

The control unit 153 generates the clocks CLK1 and CLK2 by adjusting a phase of the reference clock input from the reference clock generation unit 152, on the basis of the reception voltage detected by the voltmeter 145. When generating the clocks CLK1 and CLK2, the control unit 153 refers to table data for phase control in which the reception voltage and the phase are associated with each other. The table data for phase control is stored in the memory 156.

The operation monitoring unit 154 monitors following items in order to monitor an operation of the control device 150.

The operation monitoring unit 154 monitors the reception voltage detected by the voltmeter 145 and determines whether or not the reception voltage is a desired voltage value. The desired voltage value is a voltage that the power receiver 100 needs to charge the battery 220.

Furthermore, in a case where the reception voltage is lower than the desired voltage value, the operation monitoring unit 154 determines whether or not the reception voltage cyclically changes. In a case where the rectangular wave signal includes a beat component, the reception voltage cyclically changes. When the beat occurs in the rectangular wave signal, there is a case where the reception voltage decreases. In a case where the reception voltage decreases, the operation monitoring unit 154 determines whether or not the reception voltage cyclically changes in order to determine whether or not the decrease is caused by the beat.

Furthermore, the operation monitoring unit 154 monitors a difference between frequencies of the reference clock generated by the reference clock generation unit 152 and the rectangular wave signal input from the binarization circuit 118. This is because, when the difference between the frequencies of the reference clock and the rectangular wave signal becomes larger than a predetermined value, the resonance state is caused, and it is not possible to receive power in the resonance state.

Furthermore, the operation monitoring unit 154 refers to table data for monitoring and monitors whether or not a relationship between the phase difference between the reference clock and the rectangular wave signal and a phase applied to the reference clock when the control unit 153 generates the clocks CLK1 and CLK2 is appropriate. The appropriate relationship between the phase difference between the reference clock and the rectangular wave signal and the phase applied to the reference clock indicates that the difference between the phase difference between the reference clock and the rectangular wave signal and the phase applied to the reference clock is equal to or less than a predetermined allowable value.

The table data for monitoring used in the processing by the operation monitoring unit 154 is table data in which the phase applied to the reference clock when the control unit 153 generates the clocks CLK1 and CLK2 is associated with the phase difference between the reference clock and the rectangular wave signal. The table data for monitoring is stored in the memory 156.

The communication unit 155 is a communication unit that wirelessly communicates with the power transmitter 10. The communication unit 155 is a communication device that performs near field communication, for example, Bluetooth (registered trademark).

The memory 156 stores data that is needed for the control device 150 to control the power receiver 100. The data stored in the memory 156 includes the rated output (rated capacity) of the battery 220, an internal resistance, data indicating power that is needed for charging, the table data for phase control, and the table data for monitoring.

Figure 7:
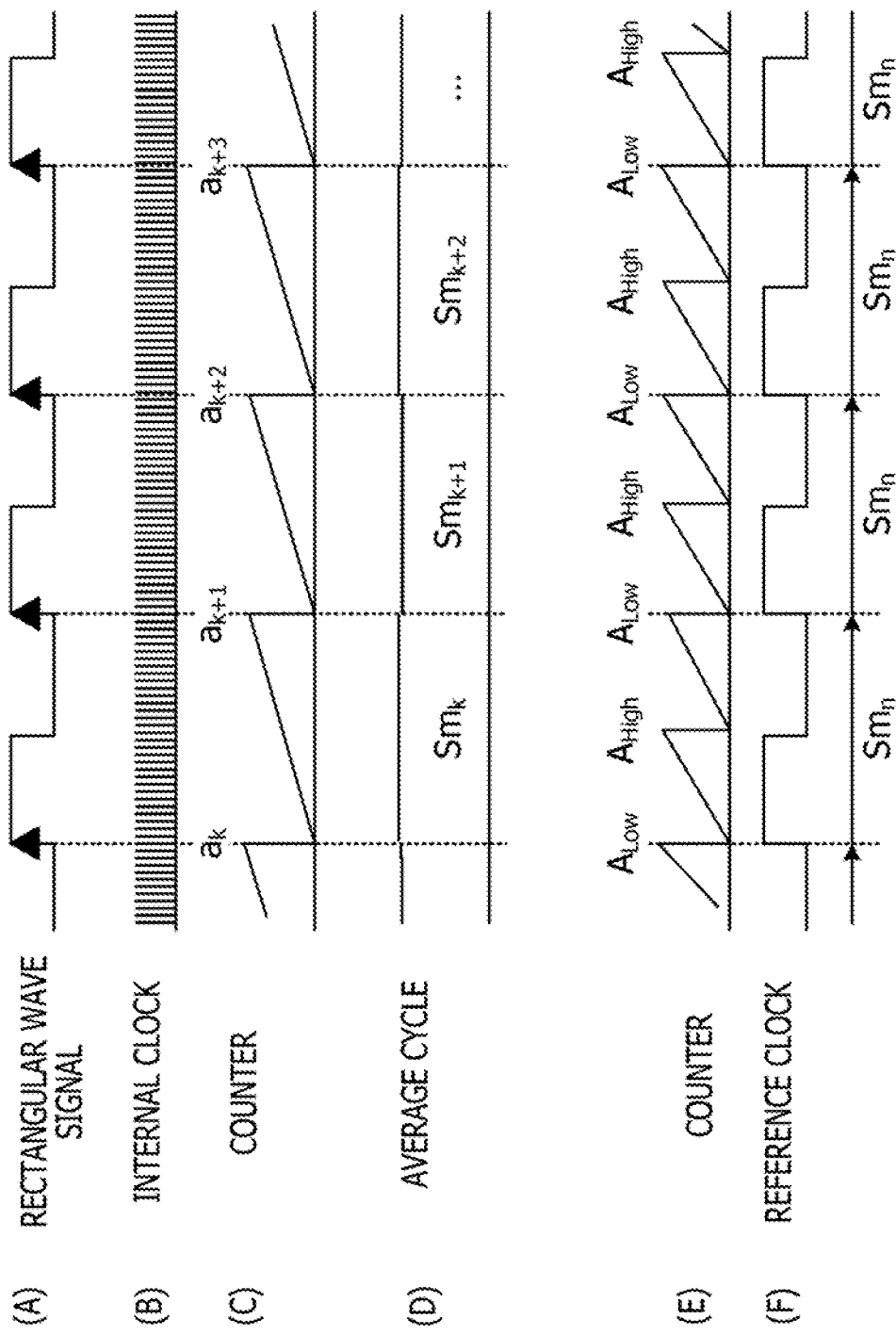
FIG. 7 is a diagram for explaining processing executed by an averaging processing unit and a reference clock generation unit.

Next, processing for obtaining the cycle of the rectangular wave signal by the averaging processing unit 151 and processing for generating the reference clock by the reference clock generation unit 152 will be described with reference to FIG. 7. FIG. 7 is a diagram for explaining processing executed by the averaging processing unit 151 and the reference clock generation unit 152.

First, the averaging processing unit 151 counts the cycle of the rectangular wave signal input from the binarization circuit 118 illustrated in (A) by using the internal clock illustrated in (B). The averaging processing unit 151 starts counting at the timing of the rising of the rectangular wave signal and obtains a count value $a_k$ that is obtained until next rising timing as illustrated in (C). The averaging processing unit 151 continuously obtains count values $a_k$, $a_{k+1}$, $a_{k+2}$, $a_{k+3}$, . . . over a plurality of cycles. The reference k is a value indicating the number of times when the cycle of the rectangular wave signal is obtained. In a case where the cycle is obtained n times, the reference k is a value of one to n. It is sufficient that the value of n be set to a predetermined value in advance.

The averaging processing unit 151 obtains a cycle $S_k$ of the rectangular wave signal on the basis of the following equation (1). Here, the reference T indicates a cycle of the internal clock.

[Expression 1]

$$S_k = a_k T \qquad (1)$$

The averaging processing unit 151 obtains average cycles $Sm_k$, $Sm_{k+1}$, $Sm_{k+2}$ . . . of the plurality of cycles $S_k$, $S_{k+1}$, $S_{k+2}$, $S_{k+3}$ . . . of the rectangular wave signal by using the following equation (2) (refer to (D)).

[Expression 2]

$$Sm_k = (\Sigma_{I=1}^{k} s_1)/k \qquad (2)$$

In order to obtain the average cycle $Sm_k$ over n cycles, the averaging processing unit 151 obtains the cycle $S_k$ of the rectangular wave signal over more number of times (n) to obtain an average cycle $Sm_n$ with higher accuracy. After obtaining the average cycle $Sm_n$ for n cycles, the averaging processing unit 151 outputs data indicating the average cycle $Sm_n$ to the reference clock generation unit 152.

When acquiring the data indicating the average cycle $Sm_n$ from the averaging processing unit 151, the reference clock generation unit 152 counts the internal clock and generates a reference clock of which a duty having the average cycle $Sm_n$ as one cycle is 50%.

More specifically, as Illustrated in (E) of FIG. 7, the reference clock generation unit 152 counts the internal clock, outputs a reference clock at a High (H) level until the count value reaches $A_{high} = Sm_n/2T$ (refer to (F)), and outputs a reference clock at a Low (L) level until the count value reaches $A_{Low} = Sm_n/2T$ when the count value has reached $A_{high}$ (refer to (F)). By repeating such processing, the reference clock generation unit 152 generates a reference clock that has a cycle equal to that of the rectangular wave signal and has a phase equal to the rising and the falling of the rectangular wave signal.

Note that, in a case where $Sm_n/2T$ is not an integer, the reference clock generation unit 152 sets a period of the H level of the reference clock and a period of the L level as follows.

In a case where $Sm_n/2T$ is not an integer, the reference clock generation unit 152 sets the period of the H level of the reference clock and the period of the L level according to the following equations (3) and (4) by using CEILING (ceiling) function and FLOOR (floor) function.

[Expression 3]

$$A_{High} = \text{floor}(Sm_n/2T), A_{Low} = \text{ceil}(Sm_n/2T) \qquad (3)$$

[Expression 4]

$$A_{High} = \text{ceil}(Sm_n/2T), A_{Low} = \text{floor}(Sm_n/2T) \qquad (4)$$

In the equation (3), a count value $A_{High}$ is a value obtained by rounding up a value after the decimal point, and a count value $A_{Low}$ is a value obtained by rounding down a value after the decimal point. Furthermore, in the equation (4), the count value $A_{High}$ is a value obtained by rounding down a value after the decimal point, and the count value $A_{Low}$, is a value obtained by rounding up a value after the decimal point.

In a case where $Sm_n/2T$ is not an integer, the reference clock generation unit 152 generates the reference clock by alternately using the equations (3) and (4) for each cycle of the reference clock.

Figure 8:
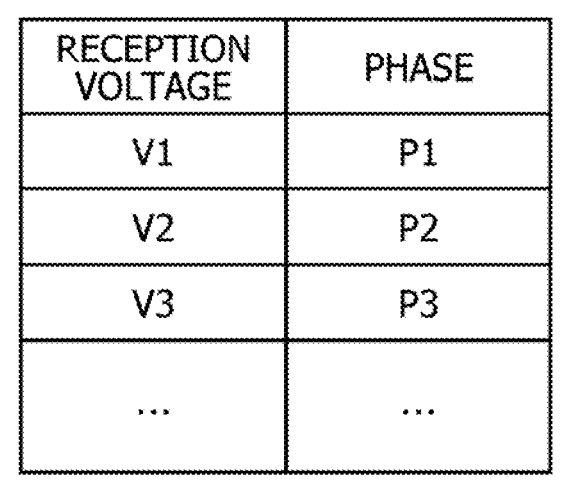
Figure 9:
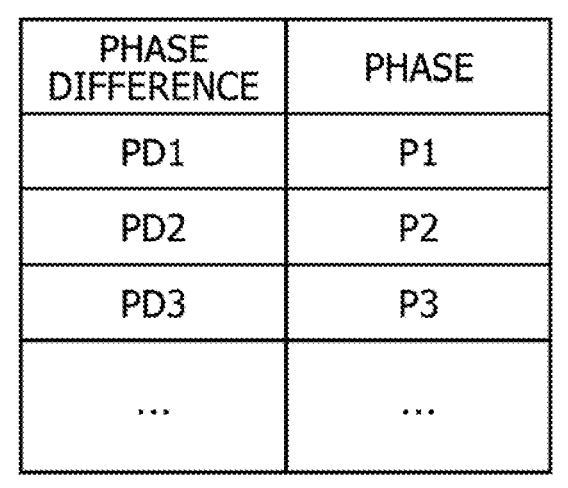

Next, the table data for phase control and the table data for monitoring will be described with reference to FIGS. 8 and 9. FIG. 8 is a diagram illustrating the table data for phase control. FIG. 9 is a diagram illustrating the table data for monitoring.

As illustrated in FIG. 8, the table data for phase control is data in which the reception voltage is associated with the phase, and indicates the phase applied to the reference clock when the clocks CLK1 and CLK2 are generated. In FIG. 8, phases P1, P2, and P3 are respectively associated with reception voltages V1, V2, and V3.

In order to obtain a desired received power to charge the battery 220 by the power receiver 100, it is desirable that the reception voltage be a desired voltage. In a case where the reception voltage is higher than the desired voltage, it is possible to lower the reception voltage by shifting the phases of the clocks CLK1 and CLK2 with respect to the phase of the resonance power. To enable such control, the table data for phase control in which the reception voltage is associated with the phase is used.

Furthermore, as illustrated in FIG. 9, the table data for monitoring is data in which the phase difference between the reference clock and the rectangular wave signal Is associated with the phase applied to the reference clock when the control unit 153 generates the clocks CLK1 and CLK2. In FIG. 9, the phases P1, P2, and P3 are respectively associated with phase differences PD1, PD2, and PD3.

If the phase of the reference clock is shifted when the clocks CLK1 and CLK2 are generated, the phase of the rectangular wave signal is shifted in accordance with the shift of the phase of the reference clock. Driving the switches 131X and 131Y by the clocks CLK1 and CLK2 in which the phase of the reference clock is delayed delays the phase of the rectangular wave signal. Furthermore, driving the switches 131X and 131Y by the clocks CLK1 and CLK2 of which the phase of the reference clock is advanced advances the phase of the rectangular wave signal.

The operation monitoring unit 154 of the power receiver 100 refers to the table data for monitoring and monitors whether or not the relationship between the phase difference between the reference clock and the rectangular wave signal and the phase applied to the reference clock when the control unit 153 generates the clocks CLK1 and CLK2 is appropriate.

Figure 10:
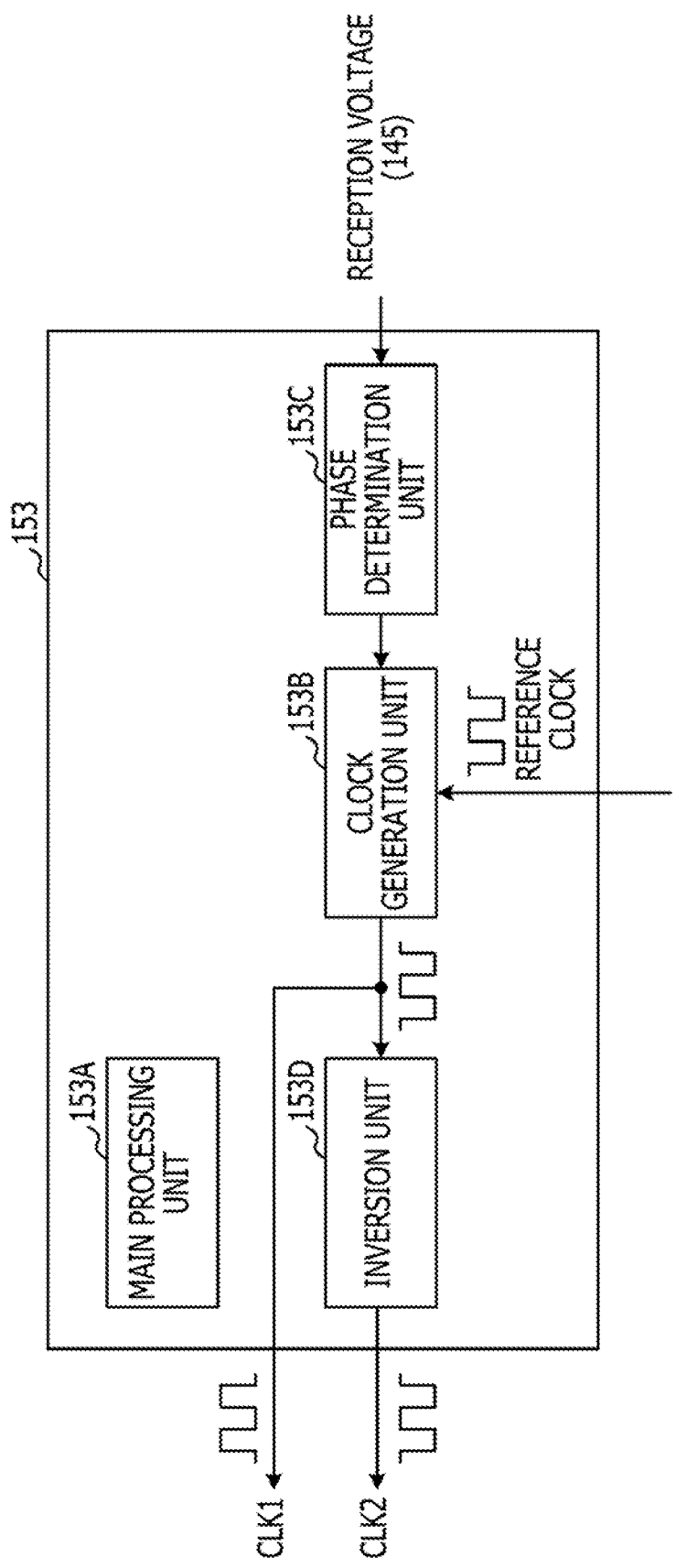
FIG. 10 is a diagram illustrating an internal configuration of a control unit.
Figure 11:
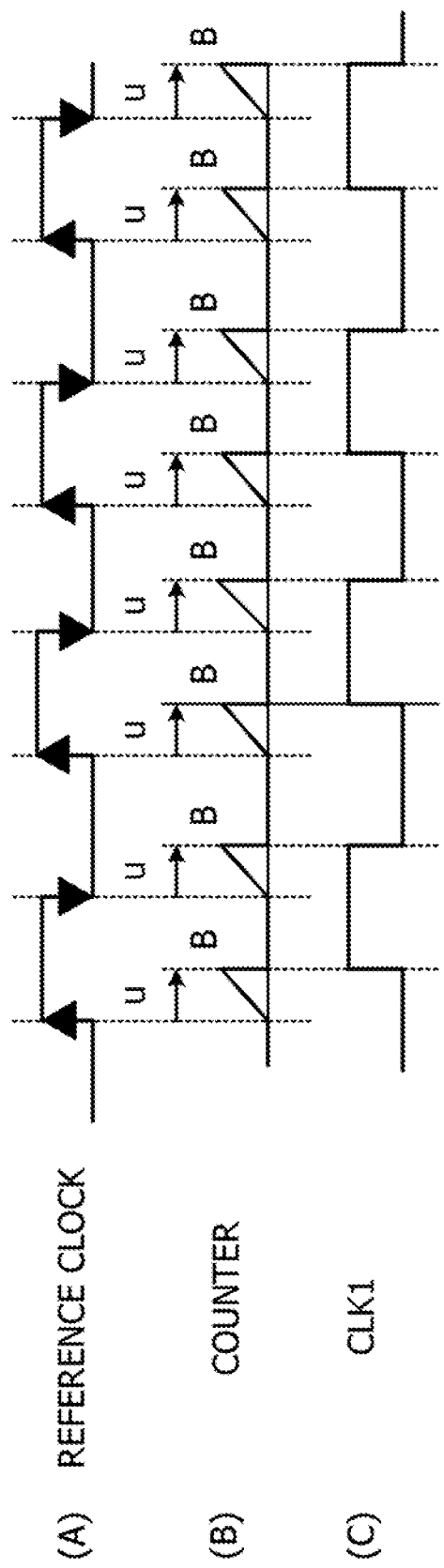
FIG. 11 is a diagram illustrating clock generation processing executed by the control unit.

FIG. 10 is a diagram illustrating an internal configuration of the control unit 153. FIG. 11 is a diagram for explaining processing for generating the clocks CLK1 and CLK2 by the control unit 153.

As illustrated in FIG. 10, the control unit 153 includes a main processing unit 153A, a clock generation unit 153B, a phase determination unit 153C, and an inversion unit 153D.

The main processing unit 153A is a determination unit that controls processing of the control unit 153 and executes processing other than processing executed by the clock generation unit 153B, the phase determination unit 153C, and the inversion unit 153D. Furthermore, the main processing unit 153A obtains the received power on the basis of the reception voltage measured by the voltmeter 145 and the internal resistance value R of the battery 220. Data indicating the internal resistance value R of the battery 220 is stored in the memory 156. Note that the data indicating the internal resistance value R of the battery 220 may be acquired from an IC that manages the charging of the battery 220.

The phase determination unit 153C refers to the table data for phase control in which the reception voltage and the phase are associated with each other and determines the phase to be applied to the clocks CLK1 and CLK2 on the basis of the reception voltage input from the voltmeter 145. The phase determination unit 153C outputs data indicating the determined phase to the clock generation unit 153B.

The clock generation unit 153B generates the clock CLK1 by shifting the phase of the reference clock input from the reference clock generation unit 152 by the phase input from the phase determination unit 153C and outputs the clock CLK1.

More specifically, the clock generation unit 153B counts the internal clock from the rising of the reference clock illustrated in (A) of FIG. 11. When the count value becomes a phase u determined by the phase determination unit 153C as illustrated in (B) of FIG. 11, the clock generation unit 153B rises the clock CLK1 as illustrated in (C) of FIG. 11. When a cycle T of the internal clock is used, a count value B that is counted by the clock generation unit 153B as the phase u is B=u/T.

Furthermore, in a predetermined case, the clock generation unit 153B generates the clocks CLK1 and CLK2 used to turn off or on both of the switches 131X and 131Y. The clocks CLK1 and CLK2 that turn off both of the switches 131X and 131Y are signals fixed to the L level, and the clocks CLK1 and CLK2 that turn on both of the switches 131X and 131Y are signals fixed to the N level.

The inversion unit 153D generates the clock CLK2 by inverting the clock CLK1 input from the clock generation unit 153B and outputs the clock CLK2.

As described above, the control unit 153 outputs the clocks CLK1 and CLK2. Then, the switches 131X and 131Y are respectively driven by the clocks CLK1 and CLK2.

Figure 12A:
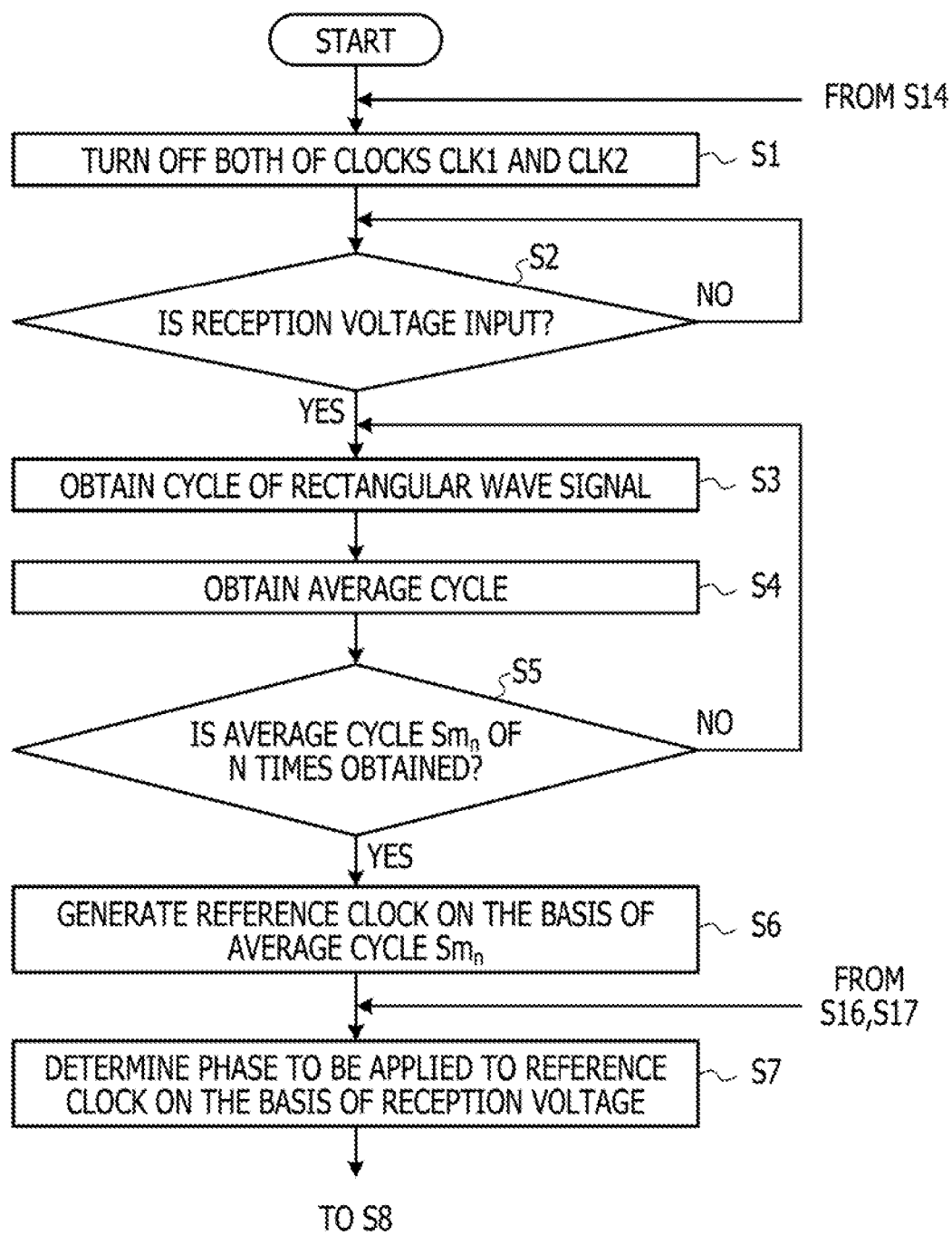
FIGS. 12A and 12B are a flowchart Illustrating processing executed by the control device.
Figure 12B:
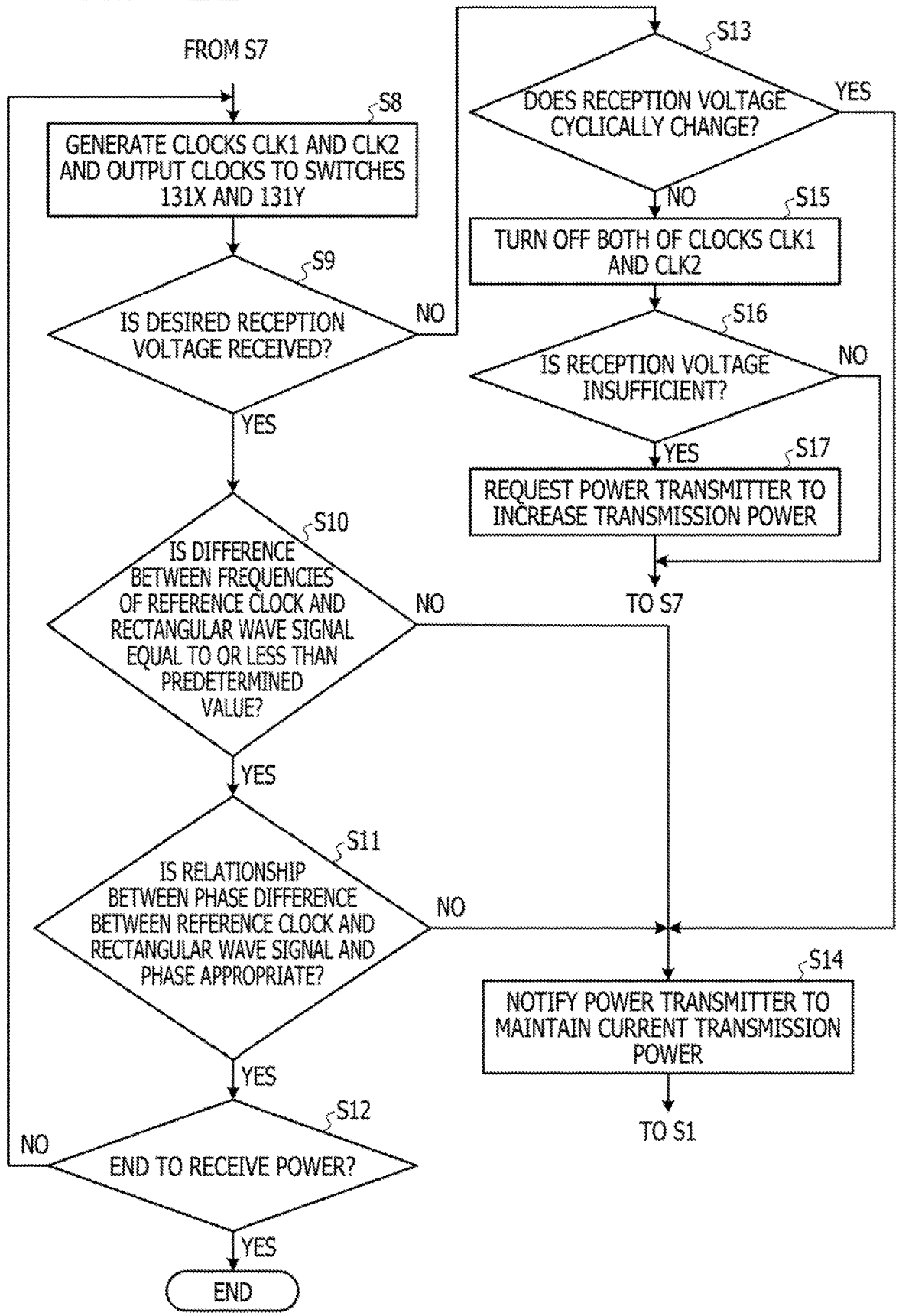

FIGS. 12A and 12B are a flowchart illustrating processing executed by the control device 150.

When the control device 150 starts the processing, the control unit 153 turns off both of the clocks CLK1 and CLK2 (step S1). With this operation, both of the switches 131X and 131Y are turned off.

The control unit 153 determines whether or not the reception voltage is input from the voltmeter 145 (step S2). In a case where the reception voltage is not input from the voltmeter 145 (S2: NO), the control unit 153 repeatedly executes the processing in step S2 until the reception voltage is input.

When it is determined by the control unit 153 that the reception voltage is input from the voltmeter 145 (S2: YES), the averaging processing unit 151 obtains the cycle of the rectangular wave signal (step S3).

Next, the averaging processing unit 151 obtains the average cycle (step S4). By repeatedly executing the processing in step S4 in a loop of steps S3 to S5, the plurality of cycles $S_k$, $S_{k+1}$, $S_{k+2}$, $S_{k+3}$ . . . of the rectangular wave signal is obtained.

Next, the averaging processing unit 151 determines whether or not the average cycle $Sm_n$ of n times is obtained (step S5). When determining that the average cycle $Sm_n$ of n times is not obtained (S5: NO), the averaging processing unit 151 returns the flow to step S3.

When the averaging processing unit 151 determines that the average cycle $Sm_n$ of n times is obtained (S5: YES), the reference clock generation unit 152 generates the reference clock on the basis of the average cycle $Sm_n$ (step S6).

Next, the control unit 153 refers to the table data for phase control and determines the phase to be applied to the reference clock on the basis of the reception voltage (step S7).

Next, the control unit 153 generates the clocks CLK1 and CLK2 by applying the phase determined in step S7 to the reference clock and outputs the clocks CLK1 and CLK2 to the switches 131X and 131Y (step S8).

Next, the operation monitoring unit 154 determines whether or not a desired reception voltage is obtained (step S9). The desired reception voltage is a voltage that the power receiver 100 needs to charge the battery 220. The operation monitoring unit 154 executes the processing in step S9 in order to monitor a power receiving state of the power receiver 100.

When it is determined that the desired reception voltage is obtained (S9: YES), the operation monitoring unit 154 monitors a difference between the frequencies of the reference clock generated by the reference clock generation unit 152 and the rectangular wave signal input from the binarization circuit 118 and determines whether or not the difference is equal to or less than a predetermined value (step S10). This is because, when the difference between the frequencies of the reference clock and the rectangular wave signal becomes larger than a predetermined value, the resonance state is caused, and it is not possible to receive power in the resonance state.

When it is determined that the difference is equal to or less than the predetermined value (S10: YES), the operation monitoring unit 154 monitors the relationship between the phase difference between the reference clock and the rectangular wave signal and the phase applied to the reference clock when the control unit 153 generates the clocks CLK1 and CLK2 and determines whether or not the relationship is appropriate (step S11). For example, the operation monitoring unit 154 determines whether or not the difference between the phase difference between the reference clock and the rectangular wave signal and the phase applied to the reference clock is equal to or less than a predetermined allowable value. This is because, when the difference exceeds the allowable value, there is a case where it is not possible to receive power in the resonance state.

When the operation monitoring unit 154 determines that the relationship is appropriate (S11: YES), the control unit 153 determines whether or not to end the power reception (step S12). The power reception ends, for example, in a case where a user of the power receiver 100 performs an operation to end the power reception. The main processing unit 153A of the control unit 153 executes the processing in step S12.

When determining to end the power reception (S12: YES), the control unit 153 ends the series of processing (END).

Furthermore, when determining not to end the power reception (S12: NO), the control unit 153 returns the flow to step S8.

Furthermore, when operation monitoring unit 154 determines in step S9 that the desired reception voltage is not obtained (S9: NO), the operation monitoring unit 154 determines whether or not the reception voltage cyclically changes (step S13). This determination is made to determine whether or not a beat occurs.

When determining that the reception voltage cyclically changes (S13: YES), the operation monitoring unit 154 notifies the power transmitter 10 to maintain current transmission power (step S14). This is because, in a case where the beat occurs, it is considered that the transmission power of the power transmitter 10 has no problem and the beat is caused by the phase or the cycle of switching of the switches 131X and 131Y of the power receiver 100, and the power receiver 100 can execute processing for increasing the received power by regenerating the clocks CLK1 and CLK2 on the basis of the rectangular wave signal.

When ending the processing in step S14, the control unit 153 returns the flow to step S1. This operation is performed to set the phase and the cycle of the switching of the switches 131X and 131Y to appropriate values by regenerating the clocks CLK1 and CLK2 by executing the processing again from the processing in step S1.

Furthermore, when the operation monitoring unit 154 determines that the reception voltage does not cyclically change (S13: NO), the control unit 153 turns off both of the clocks CLK1 and CLK2 (step S15). This operation is performed to turn off both of the clocks CLK1 and CLK2 and prepare for determining whether or not the received power is sufficient in a state of complete resonance.

Next, the operation monitoring unit 154 determines whether or not the received power is insufficient (step S16). The operation monitoring unit 154 compares the received power calculated by the main processing unit 153A with the power that is needed for charging the battery 220 stored in the memory 156 and determines whether or not the received power is equal to or more than the power that is needed for charging the battery 220.

When determining that the received power is insufficient (S16: YES), the operation monitoring unit 154 requests the power transmitter 10 to increase the transmission power (step S17). Because, in this condition, even when the power receiver 100 adjusts the phases of the clocks CLK1 and CLK2, the received power is not increased. Therefore, the increase in the transmission power is requested.

When the processing in step S17 ends, the control unit 153 proceeds the flow to step S7. This operation is performed to determine the phase for an Increase in the transmission power.

Furthermore, when the operation monitoring unit 154 determines that the received power is not insufficient (S16: NO), the control unit 153 skips step S17 and proceeds the flow to step S7. This operation is performed to determine the phase in correspondence with the reception voltage of the current received power.

The control device 150 repeatedly executes the series of processing described above.

As described above, according to the embodiment, since the power receiver 100 generates the clocks CLK1 and CLK2 on the basis of the rectangular wave signal (received power), it is possible to synchronize the switching of the switches 131X and 131Y with the resonance of the received power.

Therefore, even in a case where the frequency of the received power differs from a design value, for example, as in a case where a beat occurs in the received power, it is possible to synchronize the switching of the switches 131X and 131Y with the resonance of the received power.

Therefore, according to the embodiment, it is possible to provide the power receiver 100, the power transmission system, and the power receiving method that can efficiently receive power.

Furthermore, the operation monitoring unit 154 determines whether or not the reception voltage is a desired voltage value in order to monitor the operation of the control device 150. In a case where the reception voltage is lower than the desired voltage value, it is determined whether or not the reception voltage cyclically changes. Then, in a case where the reception voltage cyclically changes, the operation monitoring unit 154 notifies the power transmitter 10 to maintain the current transmission power.

Therefore, in a case where the received power is lowered due to the beat, the received power can be increased by adjusting the phase or the cycle of the switching of the switches 131X and 131Y by the power receiver 100, without increasing the transmission power of the power transmitter 10.

Furthermore, the operation monitoring unit 154 monitors the difference between the frequencies of the reference clock and the rectangular wave signal and notifies the power transmitter 10 to maintain the current transmission power when the difference between the frequencies becomes larger than a predetermined value.

Therefore, in a case where the received power is lowered due to the increase in the difference between the frequencies of the reference clock and the rectangular wave signal, the received power can be Increased by adjusting the phase or the cycle of the switching of the switches 131X and 131Y by the power receiver 100, without increasing the transmission power of the power transmitter 10.

Furthermore, in a case where the relationship between the phase difference between the reference clock and the rectangular wave signal and the phase applied to the reference clock is not appropriate, the operation monitoring unit 154 notifies the power transmitter 10 to maintain the current transmission power.

Therefore, in a case where the received power is lowered due to the inappropriate relationship between the phase difference between the reference clock and the rectangular wave signal and the phase applied to the reference clock, the received power can be increased by adjusting the phase or the cycle of the switching of the switches 131X and 131Y by the power receiver 100, without increasing the transmission power of the power transmitter 10.

Note that, in the above description, a form has been described in which the received power is adjusted by adjusting the phase difference of the clocks CLK1 and CLK2 by the control device 150 of the power receiver 100. However, the method for adjusting the received power is not limited to such a method. For example, the received power may be adjusted by adjusting a duty ratio of the clocks CLK1 and CLK2 in a state where the phase difference of the clocks CLK1 and CLK2 is set to a certain phase difference.

Furthermore, in the above description, a form has been described in which, when determining in step S10 that the difference is equal to or less than the predetermined value, the operation monitoring unit 154 monitors the relationship between the phase difference between the reference clock and the rectangular wave signal and the phase applied to the reference clock as the processing in step S11. However, it does not need to execute the processing in step S11.

Furthermore, the directions of the diodes 132X and 132Y of the adjuster 130 may be opposite to the directions illustrated in FIG. 4.

Furthermore, in the above description, a form has been described in which the electronic device 200 is a terminal, for example, a tablet computer, a smartphone, or the like. However, the electronic device 200 may be, for example, an electronic device including a rechargeable battery such as a notebook type personal computer (PC), a mobile phone terminal, a portable game machine, a digital camera, a video camera, or the like.

Although a power receiver, a power transmission system, and a power receiving method according to the exemplary embodiment have been described in detail, it is understood that the embodiments are not limited to the embodiment disclosed in detail, and various changes and alterations could be made without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power receiver comprising:
   a secondary-side resonant coil that includes a resonant coil circuit and receives power from a primary-side resonant coil with magnetic field resonance or electric field resonance generated between the secondary-side resonant coil and the primary-side resonant coil;
   a capacitor inserted into the resonant coil circuit of the secondary-side resonant coil in series;
   a series circuit including a first switch and a second switch and coupled to the capacitor in parallel;
   a first rectifying element coupled to the first switch in parallel and having a first rectification direction;
   a second rectifying element coupled to the second switch in parallel and having a second rectification direction opposite to the first rectification direction;
   a detection circuit that detects a voltage or a current supplied to the secondary-side resonant coil;
   a binarization processing circuit that outputs a rectangular wave obtained by binarizing the voltage or the current detected by the detection circuit;
   a rectangular wave detection circuit that detects a rising or falling timing and a cycle of the rectangular wave output from the binarization processing circuit;
   a reference clock generation circuit that generates a reference clock based on the rising or falling timing and the cycle of the rectangular wave detected by the rectangular wave detection circuit;
   a control circuit that generates a control clock used to switch on and off of the first switch and the second switch by adjusting a phase or a duty ratio of the reference clock based on the voltage or the current detected by the detection circuit; and
   a control clock generation circuit that generates a control clock,
   wherein the rectangular wave detection circuit counts the control clocks from the rising of the rectangular wave to the falling, and
   detects the cycle of the rectangular wave based on an average value of the number of counting obtained over a plurality of the cycles of the rectangular wave.

2. The power receiver according to claim 1, wherein the reference clock generation circuit generates the reference clock by repeatedly counting the control clock over a half of the cycle of the rectangular wave from the rising or falling timing of the rectangular wave.

3. The power receiver according to claim 1, wherein the control circuit adjusts the phase or the duty ratio of the reference clock in accordance with the voltage or the current detected by the detection circuit.

4. The power receiver according to claim 1, further comprising:

a communication circuit that performs data communication with a power transmitter including the primary-side resonant coil; and an operation monitoring circuit that monitors an operation on the basis of the voltage or the current detected by the detection circuit, the rising or falling timing and the cycle of the rectangular wave detected by the rectangular wave detection circuit, the reference clock generated by the reference clock generation circuit, and the control clock generated by the control circuit, wherein in a case where the voltage or the current detected by the detection circuit is not a desired voltage or current and the voltage or the current detected by the detection circuit cyclically changes, the operation monitoring circuit transmits a holding request for requesting the power transmitter to hold transmission power via the communication circuit.

5. The power receiver according to claim 4, wherein in a case where the voltage or the current detected by the detection circuit is not the desired voltage or current and the voltage or the current detected by the detection circuit does not cyclically change, the operation monitoring circuit determines whether or not the received power is insufficient in a state where the first switch and the second switch are turned off, and in a case where the received power is insufficient, the operation monitoring circuit transmits an increase request for requesting the power transmitter to increase transmission power via the communication circuit.

6. The power receiver according to claim 1, further comprising:

a communication circuit that performs data communication with a power transmitter including the primary-side resonant coil; and an operation monitoring circuit that monitors an operation on the basis of the voltage or the current detected by the detection circuit, the rising or falling timing and the cycle of the rectangular wave detected by the rectangular wave detection circuit, the reference clock generated by the reference clock generation circuit, and the control clock generated by the control circuit, wherein in a case where the voltage or the current detected by the detection circuit is the desired voltage or current and a difference between a frequency obtained on the basis of the cycle detected by the rectangular wave detection circuit and a frequency of the reference clock is not equal to or less than a predetermined value, the operation monitoring circuit transmits a holding request for requesting the power transmitter to hold transmission power via the communication circuit.

7. The power receiver according to claim 6, wherein in a case where the voltage or the current detected by the detection circuit is the desired voltage or current and the difference between the frequency obtained on the basis of the cycle detected by the rectangular wave detection circuit and the frequency of the reference clock is equal to or less than the predetermined value, the operation monitoring circuit determines whether or not a relationship between a phase difference between the reference clock and the rectangular wave and a difference between phases or duty ratios of the reference clock and the control clock is appropriate, and in a case where the relationship is appropriate, the operation monitoring circuit transmits the holding request for requesting the power transmitter to hold transmission power via the communication circuit.

8. A power transmission system comprising:

a power transmitter including a primary-side resonant coil; and a power receiver that receives power from the power transmitter, wherein the power receiver includes:

a secondary-side resonant coil that includes a resonant coil circuit and receives power from a primary-side resonant coil with magnetic field resonance or electric field resonance generated between the secondary-side resonant coil and the primary-side resonant coil;

a capacitor inserted into the resonant coil circuit of the secondary-side resonant coil in series;

a series circuit including a first switch and a second switch and coupled to the capacitor in parallel;

a first rectifying element coupled to the first switch in parallel and having a first rectification direction;

a second rectifying element coupled to the second switch in parallel and having a second rectification direction opposite to the first rectification direction;

a detection circuit that detects a voltage or a current supplied to the secondary-side resonant coil;

a binarization processing circuit that outputs a rectangular wave obtained by binarizing the voltage or the current detected by the detection circuit;

a rectangular wave detection circuit that detects a rising or falling timing and a cycle of the rectangular wave output from the binarization processing circuit; a reference clock generation circuit that generates a reference clock based on the rising or falling timing and the cycle detected by the rectangular wave detection circuit;

a control circuit that generates a control clock used to switch on and off of the first switch and the second switch by adjusting a phase or a duty ratio of the reference clock based on the voltage or the current detected by the detection circuit; and a control clock generation circuit that generates a control clock, wherein the rectangular wave detection circuit counts the control clocks from the rising of the rectangular wave to the falling, and detects the cycle of the rectangular wave based on an average value of the number of counting obtained over a plurality of the cycles of the rectangular wave.

9. A power receiving method of a power receiver including:

a secondary-side resonant coil that includes a resonant coil circuit and receives power from a primary-side resonant coil with magnetic field resonance or electric field resonance generated between the secondary-side resonant coil and the primary-side resonant coil;

a capacitor inserted into the resonant coil circuit of the secondary-side resonant coil in series;

a series circuit including a first switch and a second switch and coupled to the capacitor in parallel;

a first rectifying element coupled to the first switch in parallel and having a first rectification direction;

a second rectifying element coupled to the second switch in parallel and having a second rectification direction opposite to the first rectification direction; and a detection circuit that detects a voltage or a current supplied to the secondary-side resonant coil, the power receiving method comprising:

outputting a rectangular wave obtained by binarizing a voltage or a current detected by the detection circuit;

detecting a rising or falling timing and a cycle of the rectangular wave; generating a reference clock based on the rising or falling timing and the cycle; and switching on and off of the first switch and the second switch by adjusting a phase or a duty ratio of the reference clock based on the detected voltage or current;

counting a control clock from the rising of the rectangular wave to the falling; and detecting the cycle of the rectangular wave based on an average value of the number of counting obtained over a plurality of the cycles of the rectangular wave.

* * * * *